United States Patent [19]

St. Clair

[11] Patent Number: 6,060,560
[45] Date of Patent: May 9, 2000

[54] POLYURETHANE COMPOSITIONS MADE FROM HYDROXY-TERMINATED POLYDIENE POLYMERS

[75] Inventor: David John St. Clair, Houston, Tex.

[73] Assignee: Shell Oil Company, Houston, Tex.

[21] Appl. No.: 09/073,666

[22] Filed: May 6, 1998

Related U.S. Application Data

[60] Provisional application No. 60/047,551, May 23, 1997.

[51] Int. Cl.[7] .................................................. C08G 71/04
[52] U.S. Cl. ......................... 525/124; 525/130; 525/131; 528/45; 528/65; 528/75; 528/85; 528/28
[58] Field of Search .................................. 525/124, 130, 525/131; 528/45, 65, 75, 85

[56] References Cited

U.S. PATENT DOCUMENTS

| | | | |
|---|---|---|---|
| 3,427,366 | 2/1969 | Verdol et al. | 260/859 |
| 3,598,882 | 8/1971 | Brinkmann et al. | 260/873 |
| 3,895,149 | 7/1975 | Sheffler et al. | 428/94 |
| 3,987,012 | 10/1976 | Statton | 260/77.5 CR |
| 4,053,446 | 10/1977 | Watabe et al. | 260/37 N |
| 4,107,256 | 8/1978 | Conrad et al. | 24/310 |
| 4,245,081 | 1/1981 | Quiring et al. | 528/65 |
| 4,329,277 | 5/1982 | Murphy | 523/122 |
| 4,371,684 | 2/1983 | Quiring et al. | 528/65 |
| 4,376,834 | 3/1983 | Goldwasser et al. | 521/159 |
| 4,507,430 | 3/1985 | Shimada et al. | 524/839 |
| 4,532,316 | 7/1985 | Henn | 528/59 |
| 4,582,879 | 4/1986 | Frisch et al. | 525/424 |
| 4,603,188 | 7/1986 | Kusakawa et al. | 528/60 |
| 4,705,721 | 11/1987 | Frisch et al. | 428/349 |
| 4,722,946 | 2/1988 | Hostettler | 521/158 |
| 5,013,811 | 5/1991 | Ross | 528/60 |
| 5,167,899 | 12/1992 | Jezic | 264/510 |
| 5,318,813 | 6/1994 | Flexman, Jr. | 428/36.9 |
| 5,344,882 | 9/1994 | Flexman | 525/131 |
| 5,393,843 | 2/1995 | Handlin, Jr. et al. | 525/332.8 |
| 5,405,911 | 4/1995 | Handlin, Jr. et al. | 525/139 |
| 5,486,570 | 1/1996 | St. Clair | 525/123 |
| 5,925,724 | 7/1999 | Cenens . | |

FOREIGN PATENT DOCUMENTS

| | | |
|---|---|---|
| 87/73299 | 1/1988 | Australia . |
| 0020774 | 7/1981 | European Pat. Off. . |
| 0047081 | 3/1982 | European Pat. Off. . |
| 0114185 | 1/1984 | European Pat. Off. . |
| 0380389 A1 | 1/1990 | European Pat. Off. . |
| 0624612 A1 | 4/1994 | European Pat. Off. . |
| 2742879 | 5/1979 | Germany . |
| 94041580 | 3/1986 | Japan . |
| 61275334 | 12/1986 | Japan . |
| 1138220 | 11/1987 | Japan . |
| 88015294 | 4/1988 | Japan . |
| 3016702 | 6/1989 | Japan . |
| 90051950 | 9/1990 | Japan . |
| 91013269 | 2/1991 | Japan . |
| 2270317 | 9/1994 | United Kingdom . |

*Primary Examiner*—David Buttner
*Attorney, Agent, or Firm*—Donald F. Haas

[57] ABSTRACT

This invention provides a process for producing a polyurethane resin from a hydrogenated polydiene diol or polyol having a functional group equivalent weight of 750 to 10000, a reinforcing agent having a functional group equivalent weight of 30 to 200, and a polyisocyanate. In a preferred embodiment, the process comprises reacting at least one of a polydiene diol or a reinforcing diol or triol with the polyisocyanate at an NCO/functional group molar ratio of 0.4 to 0.7 or a functional group/NCO molar ratio of 0.25 to 0.55 to form a stable reaction product, adding to this reaction product an additional sufficient amount of the polyisocyanate and, as needed, one or both of the polydiene diol or the reinforcing agent to bring the NCO/functional group ratio up to from 0.9 to 1.1 and to achieve a polydiene diol content of 35 to 80% w (on solids basis) and a reinforcing agent content of 2 to 17% w (on solids basis), and reacting this final mixture to form a crosslinked polyurethane product. This process can also be carried out at an OH/NCO ratio of 0.9 to 1.1 using a blocked polyisocyanate wherein the intermediate reaction product is a stable polyurethane resin.

27 Claims, 1 Drawing Sheet

REGION 1: NOT PHASE STABLE
REGION 2: SATISFACTORY COMPOSITIONS
REGION 3: VISCOSITY TOO HIGH
REGION 4: THERMOSET POLYURETHANE GEL.

POLYURETHANE COMPOSITIONS MADE FROM HYDROXY-TERMINATED POLYDIENE POLYMERS

CROSSREFERENCE TO PRIOR APPLICATION

This application claims the benefit of U.S. Provisional Application Ser. No. 60/047,551, filed May 23, 1997.

FIELD OF THE INVENTION

This invention relates to novel crosslinkable compositions comprised of hydroxy terminated polydiene polymers, polyisocyanates, and reinforcing agents. More specifically, the invention relates to the use of particular dihydroxy terminated hydrogenated diene polymers in crosslinking with polyisocyanates to produce products which are useful in coating compositions and in adhesive and sealant compositions.

BACKGROUND OF THE INVENTION

Hydroxy functional polydiene polymers (polydiene diols) are well known. U.S. Pat. No. 5,393,843 discloses that formulations containing these polymers, a melamine resin, and an acid catalyst can be cured by baking under normal bake conditions. This same patent also discloses that these polymers can be mixed with isocyanates to yield compositions which cure at ambient temperature. It is known that, for instance, hydrogenated polybutadiene diols (EB diol) can be crosslinked by reaction with polyisocyanates at stoichiometry near 1/1 NCO/OH (NCO represents the isocyanate functionality which is active in the crosslinking reaction and OH represents the hydroxyl functionality). However, for economic reasons, it is only practical to make hydrogenated polydiene diols of relatively high hydroxyl equivalent weight (OH ew). However, these compositions based on hydroxy functional polydiene polymers cured with a crosslinking agent are usually fairly soft because the polymers are relatively high in hydroxyl equivalent weight, i.e., above about 750 ew OH (hydroxyl equivalent weight is the number average molecular weight divided by the number of functional groups per molecule) and thus are elastomeric and rubbery in nature and, although they can be very useful in some applications, they are too soft and too low in cohesive strength to be widely useful in applications such as hard coatings.

Attempts to increase hardness and adhesion by increasing crosslink density by simply mixing the polydiene diols and the polyisocyanate with a reinforcing agent, such as a low molecular weight diol or triol, were unsuccessful because the reinforcers are relatively polar and so are incompatible with the relatively nonpolar polydiene polymers. Incompatibility of the components leads to poor properties, such as gloss, in the cured composition or, even worse, the compositions may phase separate upon storage prior to cure.

I have discovered that this incompatibility problem can be overcome by synthesizing polyurethane resins based on a polydiene diol, a reinforcing diol or triol, and a polyisocyanate at appropriate NCO/OH ratios which are not close to 1:1. Essentially, this involves carrying out a limited reaction among the three components in order to render them compatible.

SUMMARY OF THE INVENTION

This invention provides a process for producing a polyurethane resin from a hydrogenated polydiene diol or polyol having a hydroxyl equivalent weight of 750 to 10000, a reinforcing agent, preferably a diol or triol, having a functional group, preferably hydroxyl, equivalent weight of 30 to 200, and a polyisocyanate. In a first preferred embodiment, the process comprises reacting at least one of the polydiene diol (or polyol) or the reinforcing agent with the polyisocyanate at a NCO/functional group molar ratio (NCO refers to the isocyanate functionality on the polyisocyanate and functional group refers to the functionality on the polydiene diol or polyol and the reinforcing agent) of 0.4 to 0.7 to form a stable reaction product, adding to this reaction product an additional sufficient amount of the polyisocyanate and, as needed, one or both of the polydiene diol (or polyol) or the reinforcing agent to bring the NCO/functional group ratio up to 0.9 to 1.1 and to achieve a polydiene diol (or polyol) content of 35 to 80% w (on solids basis) (% w means percent by weight) and a reinforcing agent content of 2 to 17% w (on solids basis), and reacting this final mixture to form a crosslinked polyurethane product. This invention also provides a novel polyurethane resin which is the reaction product of the first step of the process.

In a second preferred embodiment, the process comprises reacting at least one of the polydiene diol (or polyol) or the reinforcing agent with the polyisocyanate at a functional group/NCO ratio of from 0.25 to 0.55 to form a stable isocyanate terminated reaction product, adding to this stable reaction product an additional sufficient amount of one or both of the polydiene diol (or polyol) or the reinforcing agent and, as needed, the polyisocyanate to bring the functional group/NCO ratio up to 0.9 to 1.1 and to achieve a polydiene diol (or polyol) content of 35 to 80% w (on solids basis) and a reinforcing agent content of 2 to 17% w (on solids basis), and reacting this final mixture to form a crosslinked polyurethane product. This invention also provides a novel polyurethane resin which is the reaction product of the first step of this process.

In a third preferred embodiment, the process comprises mixing the polydiene diol (or polyol), the reinforcing agent, and a blocked polyisocyanate curing agent together such that the molar ratio of functional group to completely deblocked/NCO would be from 0.9 to 1.1, the polydiene diol or polyol content is 35 to 80% w (on solids basis) and the reinforcing agent content is 2 to 17% w, then reacting these components at a temperature, usually about 80° C. to about 150° C., and for a time, usually about 0.5 hour to about 5 hours, sufficient to deblock enough of the polyisocyanate such that a stable partially reacted polyurethane resin is formed, and finally, deblocking the remainder of the blocked polyisocyanate and reacting it with the partially reacted polyurethane resin to form a crosslinked polyurethane product. This invention also provides a novel polyurethane resin which is the reaction product of the polydiene diol or polyol, the reinforcing agent, and the deblocked portion of the blocked polyisocyanate in the second step of the process. Hydroxy functional polydienes are preferred for use herein as are reinforcing agents which are diols or triols.

DETAILED DESCRIPTION OF THE INVENTION

Figure 1:
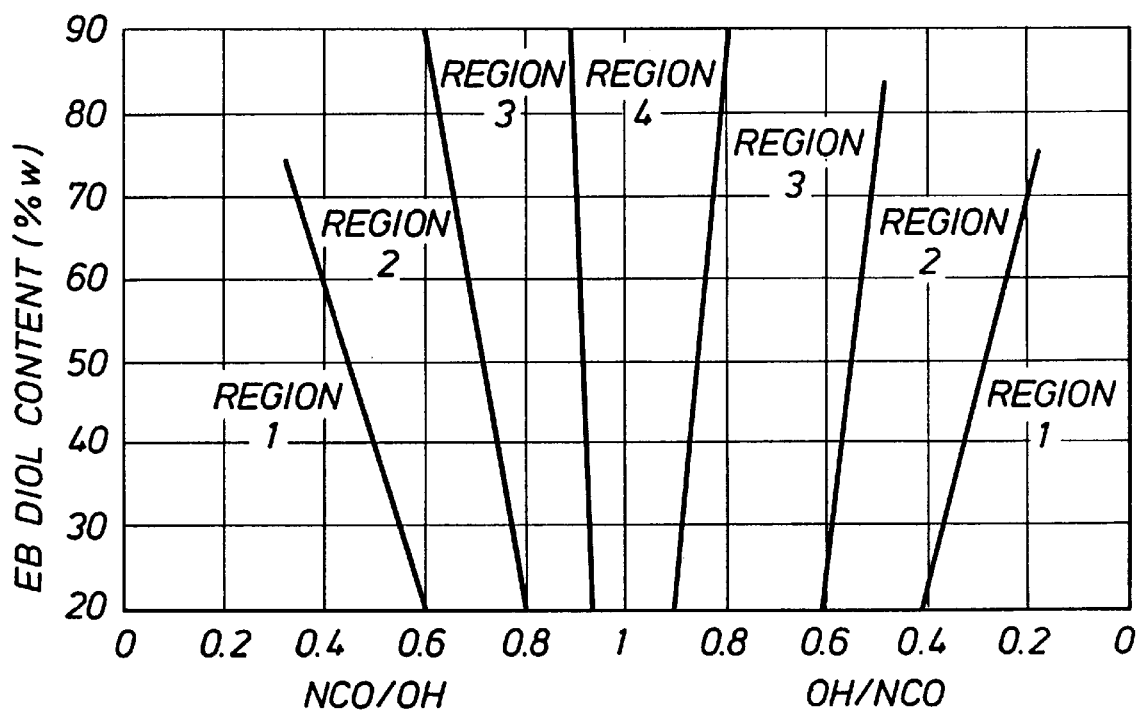
FIG. 1 shows a plot of the concentration of EB diol in the final cured polyurethane composition versus stoichiometry of the EB diol, reinforcing diol and triisocyanate mixture.

The first step of the process of the first embodiment described above produces a stable polyurethane resin composition which can be used in the above process or stored for later use. This composition comprises 40 to 90% w of the polydiene diol or polyol, 2 to 25% w of the reinforcing agent, and is reacted with the polyisocyanate at an NCO/functional group molar ratio of 0.4 to 0.7.

The first step of the process of the second embodiment described above produces a stable isocyanate-terminated polyurethane resin composition. It comprises 10 to 75% w of the polydiene diol or polyol, 1 to 10% w of the reinforcing agent, and is reacted with the polyisocyanate at a functional group/NCO molar ratio of 0.25 to 0.55. This product can also be made without the reinforcing agent.

The following table gives the actual amounts (in the lower part of the table) of the components in step (a) of the first and second embodiments for several different coating formulations.

within the range from about −150° C. to about 300° C., preferably at a temperature within the range from about 0° C. to about 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to about 20 carbon atoms and n is an integer of 1 to 4.

Conjugated diolefins which may be polymerized anionically include those conjugated diolefins containing from about 4 to about 24 carbon atoms such as 1,3-butadiene, isoprene, piperylene, methylpentadiene, phenyl-butadiene, 3,4-dimethyl-1,3-hexadiene, 4,5-diethyl-1,3-octadiene and the like. Isoprene and butadiene are the preferred conjugated diene monomers for use in the present invention because of

| Equivalent Weight | 1 | 2 | 3 | 4 | 5 | 6 | 7 | 8 | 9 | 1o | 11 | 12 |
|---|---|---|---|---|---|---|---|---|---|---|---|---|
| EB diol | 1700 | 1700 | 1700 | 1700 | 10000 | 10000 | 10000 | 10000 | 750 | 750 | 750 | 750 |
| Reinforcing diol | 80 | 80 | 80 | 80 | 50 | 50 | 150 | 150 | 50 | 50 | 150 | 150 |
| Triisocyanate | 255.5 | 255.5 | 255.5 | 255.5 | 255.5 | 255.5 | 255.5 | 255.5 | 255.5 | 255.5 | 255.5 | 255.5 |
| Equivalents | | | | | | | | | | | | |
| EB diol | 1 | 1 | 1 | 1 | 1 | 1 | 1 | 1 | 1 | 1 | 1 | 1 |
| Reinforcing diol | 8.65 | 8.65 | 0.505 | 0.505 | 60 | 60 | 5.52 | 5.52 | 3.73 | 3.73 | 0 | 0 |
| Triisocyanate | 9.65 | 9.65 | 1.505 | 1.505 | 61 | 61 | 6.52 | 6.52 | 4.73 | 4.73 | 1 | 1 |
| Coating, pbw | | | | | | | | | | | | |
| EB diol | 35.0 | 35.0 | 80.0 | 80.0 | 35.0 | 35.0 | 80.0 | 80.0 | 35.0 | 35.0 | 74.6 | 74.6 |
| Reinforcing diol | 14.2 | 14.2 | 1.9 | 1.9 | 10.5 | 10.5 | 6.6 | 6.6 | 8.7 | 8.7 | 0.0 | 0.0 |
| Triisocyanate | 50.8 | 50.8 | 18.1 | 18.1 | 54.5 | 54.5 | 13.3 | 13.3 | 56.3 | 56.3 | 25.4 | 25.4 |
| First Embodiment-step (a) | | | | | | | | | | | | |
| EB diol | 50.3 | 41.3 | 89.7 | 84.6 | 52.0 | 41.8 | 87.0 | 83.4 | 52.8 | 42.1 | 88.0 | 80.7 |
| Reinforcing diol | 20.5 | 16.8 | 2.1 | 2.0 | 15.6 | 12.5 | 7.2 | 6.9 | 13.1 | 10.5 | 0.0 | 0.0 |
| Triisocyanate | 29.2 | 41.9 | 8.1 | 13.4 | 32.4 | 45.6 | 5.8 | 9.7 | 34.0 | 47.5 | 12.0 | 19.3 |
| NCO/OH | 0.4 | 0.7 | 0.4 | 0.7 | 0.4 | 0.7 | 0.4 | 0.7 | 0.4 | 0.7 | 0.4 | 0.7 |
| Second Embodiment-step (a) | | | | | | | | | | | | |
| EB diol | 13.9 | 23.2 | 51.9 | 67.7 | 13.0 | 22.6 | 57.2 | 70.6 | 13.0 | 22.4 | 42.3 | 59.5 |
| Reinforcing diol | 5.6 | 9.4 | 1.2 | 1.6 | 4.0 | 6.8 | 4.7 | 5.8 | 3.2 | 5.6 | 0.0 | 0.0 |
| Triisocyanate | 80.5 | 67.3 | 46.9 | 30.6 | 82.7 | 70.6 | 38.1 | 23.5 | 83.8 | 72.1 | 57.7 | 40.5 |
| OH/NCO | 0.25 | 0.5 | 0.25 | 0.5 | 0.25 | 0.5 | 0.25 | 0.5 | 0.25 | 0.5 | 0.25 | 0.5 |

Hydroxy functional polydiene polymers and other polymers containing ethylenic unsaturation can be prepared by copolymerizing one or more olefins, particularly diolefins, by themselves or with one or more alkenyl aromatic hydrocarbon monomers. The copolymers may, of course, be random, tapered, block or a combination of these, as well as linear, radial or star.

The hydroxy functional polydiene polymers may be prepared using anionic initiators or polymerization catalysts. Such polymers may be prepared using bulk, solution or emulsion techniques. When polymerized to high molecular weight, the polymer will, generally, be recovered as a solid such as a crumb, a powder, a pellet or the like. When polymerized to low molecular weight, it may be recovered as a liquid such as in the present invention.

In general, when solution anionic techniques are used, copolymers of conjugated diolefins, optionally with vinyl aromatic hydrocarbons, are prepared by contacting the monomer or monomers to be polymerized simultaneously or sequentially with an anionic polymerization initiator such as group IA metals, their alkyls, amides, silanolates, naphthalides, biphenyls or anthracenyl derivatives. It is preferred to use an organo alkali metal (such as sodium or potassium) compound in a suitable solvent at a temperature their low cost and ready availability. Alkenyl (vinyl) aromatic hydrocarbons which may be copolymerized include vinyl aryl compounds such as styrene, various alkyl-substituted styrenes, alkoxy-substituted styrenes, vinyl naphthalene, alkyl-substituted vinyl naphthalenes and the like.

The hydroxy terminated polymers of this invention are generally diols when the polymer is linear but linear polyols are also useful herein. Radial and star polymers are also contemplated herein and in such case, the polymers would be polyols wherein a hydroxy group is located at the ends of most or all of the arms of such polymers.

The hydroxy functional polydiene polymers may have number average molecular weights of from about 500 to about 50,000. Lower molecular weights require excessive crosslinking whereas higher molecular weights cause very high viscosity, making processing very difficult. More preferably, the polymer is one having a number average molecular weight of from about 1,000 to about 20,000. Most preferably, the polymer is a predominately linear diol having a number average molecular weight of from about 1500 to about 10,000 (hydroxyl equivalent weight of 750 to 5000 because its a diol and has two hydroxyls) because this offers the best balance between the cost of the polymer, achieving good processing behavior, and achieving the right balance of mechanical properties in the final cured polyurethane.

Hydrogenated polybutadiene diols are preferred for use herein because they are easily prepared, they have low glass transition temperature, and they have excellent weatherability. The diols, dihydroxylated polybutadienes, are synthesized by anionic polymerization of conjugated diene hydrocarbon monomers with lithium initiators. Polyols can be synthesized in the same manner. This process is well known as described in U.S. Pat. Nos. 4,039,593 and Re. 27,145 which descriptions are incorporated herein by reference. Polymerization commences with a monolithium, dilithium, or polylithium initiator which builds a living polymer backbone at each lithium site. Typical monolithium living polymer structures containing conjugated diene hydrocarbon monomers are:

| | |
|---|---|
| X-B-Li | X-B$_1$-B$_2$-Li |
| X-A-B-Li | X-A-B$_1$-B$_2$-Li |
| X-A-B-A-Li | | wherein B represents polymerized units of one or more conjugated diene monomers such as butadiene or isoprene, A represents polymerized units of one or more vinyl aromatic monomer such as styrene, and X is the residue of a monolithium initiator such as sec-butyllithium. B can also be a copolymer of a conjugated diene and a vinyl aromatic compound. $B_1$ and $B_2$ are formed of different dienes.

Dihydroxylated polydiene diols used in this invention may also be prepared anionically such as described in U.S. Pat. Nos. 5,391,663, 5,393,843, 5,405,911, and 5,416,168 which are incorporated by reference herein. The dihydroxylated polydiene polymer can be made using a di-lithium initiator, such as the compound formed by reaction of two moles of sec-butyllithium with one mole of diisopropenylbenzene. This diinitiator is used to polymerize a diene in a solvent typically composed of 90% w cyclohexane and 10% w diethylether. The molar ratio of diinifiator to monomer determines the molecular weight of the polymer. The living polymer is then capped with two moles of ethylene oxide and terminated with two moles of methanol to yield the desired dihydroxy polydiene.

Dihydroxylated polydiene polymers can also be made using a mono-lithium initiator which contains a hydroxyl group which has been blocked as the silyl ether. Details of the polymerization procedure can be found in U.S. Pat. No. 5,376,745 which is herein incorporated by reference. A suitable initiator is hydroxypropyllithium in which the hydroxyl group is blocked as the tert-butyl-dimethylsilyl ether. This mono-lithium initiator can be used to polymerize isoprene or butadiene in hydrocarbon or polar solvent. The living polymer is then capped with ethylene oxide and terminated with methanol. The silyl ether is then removed by acid catalyzed cleavage in the presence of water yielding the desired polymer.

A dihydroxy polybutadiene unsaturated polymer within the scope of this invention can have any butadiene microstructure. A dihydroxy polybutadiene polymer to be used after hydrogenation can also have any butadiene microstructure. However, it is preferred that it have no less than about 30% 1,2-butadiene addition because, after hydrogenation, the polymer would be a waxy solid at room temperature if it contained less than about 30% 1,2-butadiene addition and, when used in the process of this invention, it would give a paste at room temperature instead of a low viscosity solution. Therefore, compositions based on a hydrogenated polybutadiene diol having less than about 30% 1,2-butadiene addition would have to be coated onto a substrate while the composition was at a temperature high enough that the composition is a homogeneous, low viscosity liquid. Alternatively, the composition could be dispersed in water while it is hot and then be handled as a waterborne dispersion. Although a hydrogenated polybutadiene having a 1,2-butadiene addition greater than about 30% will give compositions within this invention which are liquids at room temperature, it is preferred that the 1,2-butadiene content should be between about 40 and 60% to minimize viscosity of the hydrogenated polybutadiene diol.

When one of the conjugated dienes is 1,3-butadiene and is to be hydrogenated, the anionic polymerization of the conjugated diene hydrocarbons is typically controlled with structure modifiers such as diethylether or glyme (1,2-diethoxyethane) to obtain the desired amount of 1,4-addition. As described in Re 27,145 which is incorporated by reference herein, the level of 1,2-addition of a butadiene polymer or copolymer can greatly affect elastomeric properties after hydrogenation.

Linear unsaturated or hydrogenated polyisoprene diol polymers can also be used in these compositions. A dihydroxy polyisoprene polymer within the scope of this invention can have any isoprene microstructure. However, it preferably should have greater than 80% 1,4-addifion of the isoprene, preferably greater than 90% 1,4-addition of the isoprene, in order to minimize the viscosity of the polymer. Polyisoprene diols of this type can be prepared by anionic polymerization in the absence of microstructure modifiers that increase 3,4-addition of the isoprene. The diene microstructures are typically determined by $C^{13}$ nuclear magnetic resonance (NMR) in chloroform.

Another method of making the polymers of the present invention involves the use of lithium initiators having the structure:

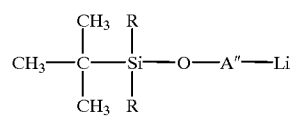

(2)

wherein each R is methyl, ethyl, n-propyl, or n-butyl and A" is an alkyl-substituted or non-substituted propyl bridging group, including —CH$_2$—CH$_2$—CH$_2$—(1,3-propyl), —CH$_2$—CH(CH$_3$)-CH$_2$—(2-methyl-1,3-propyl), and —CH$_2$—C(CH$_3$)$_2$—CH$_2$— (2,2-dimethyl-1,3-propyl), or an alkyl-substituted or non-substituted octyl bridging group, including —CH$_2$—CH$_2$—CH$_2$—CH$_2$—CH$_2$—CH$_2$—CH$_2$—CH$_2$— (1,8-octyl), because these initiators will initiate polymerization of anionic polymers at surprisingly higher polymerization temperatures with surprisingly lower amounts of dead initiator (higher efficiency) than similar initiators wherein A" is replaced by alkyl-substituted or non-substituted butyl, pentyl, or hexyl bridging groups, such as —CH$_2$—CH$_2$—CH$_2$—CH$_2$—(1,4-butyl), —CH$_2$—CH$_2$—CH$_2$—CH$_2$—CH$_2$—(1,5-pentyl), or —CH$_2$—CH$_2$—CH$_2$—CH$_2$—CH$_2$—CH$_2$—(1,6-hexyl).

Certain hydroxylated polydiene polymers useful in the present invention have the structural formula

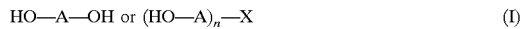

(I)

wherein A is a homopolymer of a conjugated diolefin monomer, a copolymer of two or more conjugated diolefin monomers, or a copolymer of one or more conjugated diolefin monomers with a monoalkenyl aromatic hydrocarbon monomer, where n>1 and where X is the residue of a coupling agent. During the preparation of these hydroxylated polydiene polymers, it is possible to make some mono-functional polymer having the structural formula HO—A, either by incomplete capping of the living polymer or by incomplete coupling via the coupling agent. Although it is preferred that the amount of this mono-functional polymer is minimal, satisfactory crosslinked compositions within this invention can be achieved even when the amount of mono-functional polymer is as high as 70% w of the hydroxylated polymer in the composition.

Other hydroxylated polydiene polymers useful in the present invention have the structural formula

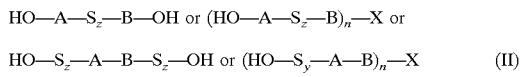

wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers, where S is a vinyl aromatic polymer block, where y and z are 0 or 1, where n is greater than or equal to 2, and where X is the residue of a coupling agent.

These polymers may contain up to 60% by weight of at least one vinyl aromatic hydrocarbon, preferably styrene. The A blocks and the B blocks can have a number average molecular weight of from 100 to 500,000, preferably 500 to 50,000, and most preferably 1000 to 20,000. The S block which may have a number average molecular weight of from 500 to 50,000. Either the A or the B block may be capped with a miniblock of polymer, 50 to 1000 number average molecular weight, of a different composition, to compensate for any initiation, tapering due to unfavorable copolymerization rates, or capping difficulties.

The molecular weights of the polymers are conveniently measured by Gel Permeation Chromatography (GPC), where the GPC system has been appropriately calibrated. The polymers can be characterized from the data in the chromatogram by calculating the number-average molecular weight (Mn) and by calculating the weight-average molecular weight (Mw), or by measuring the "peak" molecular weight. The peak molecular weight is the molecular weight of the main specie shown on the chromatogram. For anionically polymerized linear polymers, the polymer is nearly monodisperse (Mw/Mn ratio approaches unity), and usually it is adequately descriptive to report the peak molecular weight of the narrow molecular weight distribution observed. Usually, the peak molecular weight value is between Mn and Mw. The molecular weights reported here are number average molecular weights calculated from the chromatographs. The materials used in the columns of the GPC are styrene-divinylbenzene gels or silica gels. The solvent is tetrahydrofuran and the detector is a refractive index detector.

The polymers of this invention may be hydrogenated as disclosed in U.S. Pat. No. Reissue 27,145 which is herein incorporated by reference. The hydrogenation of these polymers and copolymers may be carried out by a variety of well established processes including hydrogenation in the presence of such catalysts as Raney Nickel, noble metals such as platinum and the like, soluble transition metal catalysts and titanium catalysts as in U.S. Pat. No. 5,039,755 which is also incorporated herein by reference. The polymers may have different diene blocks and these diene blocks may be selectively hydrogenated as described in U.S. Pat. No. 5,229,464 which is also incorporated herein by reference.

The reinforcing agent is a low molecular weight material having at least two functional groups which will react with the polyisocyanate crosslinker. The number average molecular weight preferably is from 60 to 600, most preferably 60 to 120. Suitable functional groups include primary and secondary alcohols, dicarboxylic acids, amino alcohols, mercaptans, and primary and secondary amines. The preferred functional groups are hydroxyls. For convenience all NCO/functional group ratios hereafter shall be referred to as NCO/OH or OH/NCO but amines, mercapatans, and dicarboxylic acids could be substituted for the OH. The equivalent weight of the reinforcing agent will usually be between about 30 and about 200 grams per functional group, preferably between about 50 and 150 grams per functional group. The functionality of the reinforcing agent should be at least two and can be as high as desired with the proviso that increasing the functionality increases the polarity which adversely affects the compatibility of the reinforcing agent with the polydiene diol. However, if the reinforcing agent can be blended or cooked into the composition, the functionality is acceptable.

Reinforcing agents preferred for use in the present invention include branched aliphatic diols having 5 to 30 carbon atoms, especially alkyl-substituted aliphatic diols such as 2-ethyl-1,3-hexane diol (PEP diol), 2,2,4-trimethyl-1,3-pentane diol (TMPD diol), and 2-ethyl-2-butyl-1,3-propane diol (BEPD diol) because they are substituted, branched diols and, as such, are not as polar and therefore not as incompatible with the polydiene polymers as unsubstituted, straight chain diols. Triols such as trimethylolpropane or triethylolpropane may also be used.

The isocyanate used in this invention is an isocyanate having an average functionality of two or more isocyanate groups per molecule. To make the preferred thermoset coatings of this invention, the functionality should be more than 2. The preferred isocyanates are those which are the least polar because they are more compatible with the polydiene polymer. Examples of suitable diisocyanates are 2,4-toluene diisocyanate (TDI), 4,4'-diphenylmethane diisocyanate (MDI), mixtures of isomers of diphenylmethane diisocyanate, paraphenyldiisocyanate, isophoronediisocyanate (IPDI), bis(4-isocyanatocyclohexyl)methane (HMDI), naphthalene diisocyanate and hexamethylene diisocyanate (HDI). Polyisocyanates can be made from these diisocyanates by dimerizing or trimerizing the diisocyanates using proprietary catalysts to yield biurets, isocyanaurates, etc.

Blocked isocyanates made by reacting these diisocyanates and polyisocyanates with suitable blocking agents are also useful. Suitable blocking agents are phenols, alcohols such as butanol, hexanol, etc., oximes such as butanone oxime and caprolactam. The particular blocking agent used determines the temperature at which the blocking agent will deblock.

Specific commercially available isocyanates which can be used in this invention include those found in the following table:

| Designation | Chemical Identification | Eq. Wt. | Supplier |
|---|---|---|---|
| Mondur M (MDI) | 1,4-diphenylmethane diisocyanate | 125 | Bayer AG |
| Mondur MR | Polymeric MDI | 134 | Bayer AG |
| Vestanat (IPDI) | Isophorone diisocyanate | 111 | Huls |
| Desmodur Z-4370 | Polymeric IPDI | 365 | Bayer AG |
| Desmodur BL4165 | Butanone oxime blocked polymeric IPDI | 519 | Bayer AG |

-continued

| Designation | Chemical Identification | Eq. Wt. | Supplier |
|---|---|---|---|
| Mondur, TD-80 (TDI) | Toluene diisocyanate | 87 | Bayer AG |
| Desmodur W (HMDI) | Methylene bis(4-cyclohexyl-isocyanate) | 131 | Bayer AG |
| Desmodur H (HDI) | 1,6-hexamethylene diisocyanate | 84 | Bayer AG |

The isocyanurate of IPDI is especially useful and is preferred for use herein because it exhibits especially good compatibility with the preferred polybutadiene diols of this invention, it has a functionality of 3 NCO groups per molecule making it easier to make compatibilize the polydiene diol and the reinforcing diol than with an isocyanate, and it has excellent stability allowing the preparation of polyurethane products which have excellent durability.

The polymerization process can be conducted in the presence of catalysts. Catalysts useful in accelerating the NCO/OH reaction are tertiary amines such as tetramethyl butane dianine, and triethylamine, pyridine, 1,4-diaza(2,2,2)bicyclo-octane and organometallic compounds such as tin dioctoate and dibutyl tin dilaurate. These catalysts are used at levels ranging from 0.001% by weight to 1.0% by weight.

Simple Two Component Polyurethane

Two component, ambient temperature cure polyurethanes consist of an "A" side and a "B" side. The "A" side usually contains everything except the isocyanate (polyols, catalysts, fillers, stabilizers, etc.) and the "B" side is usually just the isocyanate. When it is time to apply the polyurethane, the A and B components are mixed together and reaction begins. Indeed, mixing an "A" side composed of a hydrogenated polybutadiene diol having a hydroxyl equivalent weight of 1700, catalyst and solvent with a "B" side composed of an aliphatic triisocyanate such as DESMODUR Z-4370 at a 1/1 NCO/OH stoichiometry gives a crosslinked polyurethane film which is fairly soft and elastomeric. It is not surprising that the film is soft since the cured film at 1/1 NCO/OH contains about 85% w rubber (polymeric diol in this case) because of the relatively high hydroxyl equivalent weight of the polymer. Although elastomeric products are needed in many applications, films made with this simple polybutadiene diol and triisocyanate formulation will be too soft and too low in tear strength to be widely useful in applications such as tough, mar resistant coatings, or adhesives which need high shear strength. This work uses the approach to increase the hardness and strength of compositions based on such polymers by including a low molecular weight (MW) reinforcing diol or triol, along with the higher concentrations of isocyanate required to maintain 1/1 NCO/OH stoichiometry. This stoichiometry, or very close to it, is required to achieve maximum crosslink density in the final cured polyurethane which gives optimum properties to the polyurethane.

This approach of using a blend of a polybutadiene diol and a low MW diol or triol on the A side is complicated by the fact that many candidate low MW diols and triols are too polar to be compatible with the relatively nonpolar polybutadiene diols so they will not form a phase stable blend on the A side. Another complication is that many candidate low MW diols and triols are crystalline solids which are not soluble in the solvents used on the A side. PEP diol was used below to illustrate the approach of including a reinforcing diol or triol on the A side since is has relatively good compatibility with the hydrogenated polybutadiene diol (referred to hereinafter as EB diol) and because it is soluble in the required solvents.

The structures of the materials used in this work are given in Table 1. Solvents were dried over 4A Molecular Sieve. All polymers and reinforcing diols were dried under vacuum prior to use. Initially, the reinforcing diols were dried in a vacuum oven over night at 80° C. However, some reinforcing diols sublimed and plugged the vacuum line. NPG and TMPD diols were particularly bad in this respect. Another procedure was tried in which the EB diol and reinforcing diol were placed in the resin kettle and heated to 130° C. The kettle was purged with dry nitrogen for about one hour. After the purge, isobutyl acetate was added to the kettle and refluxed to rinse the sublimed reinforcing diol back into the blend. The best procedure for drying the diols was with an apparatus in which the diol was heated in a round bottom flask which was connected to the vacuum through a glass "knock out" vessel. Using this apparatus, the diols were dried for 2 hours at 120° C. under vacuum.

Unless otherwise noted, coatings were applied on cold rolled steel panels (QD412 panels from Q-Panel Corp.) using a #52 wire wound rod and were cured at ambient conditions. Coatings were also applied on thermoplastic polyolefin (TPO) plaques (DEXFLEX 777 or 880 from D&S Plastics). It is noted in the tables whether these coatings on TPO were cured at ambient or baked at 121° C. The general appearance of the coatings, such as their gloss, clarity, mar resistance, etc., was rated qualitatively. Quantitative measurements of coating properties were done using standard procedures for rocker hardness (ASTM D2134), pencil hardness (ASTM D3363), MEK rubs (ASTM D2794) and crosshatch adhesion (ASTM D2794).

TABLE 1

Identification of Ingredients

| Component | Supplier | Description |
|---|---|---|
| Polydiene Polymers | | $M_n$ = number average molecular weight, |
| | | f = number of OH groups per polymer, |
| | | 1,2-Bd = the vinyl content in weight percent, |
| | | EW = hydroxyl equivalent weight ($M_n$/f) |
| EB DIOL A | SHELL | HO—EB—OH, a hydrogenated polybutadiene diol |
| | | $M_n$ = 4000, f = 1.94, 1,2-Bd = 38%, EW = 2062 |
| EB DIOL B | SHELL | HO—EB—OH, a hydrogenated polybutadiene diol |
| | | $M_n$ = 2660, f = 1.91, 1,2-Bd = 50%, EW = 1393 |
| EB DIOL C | SHELL | HO—S/EB—OH, a hydrogenated poly(styrenelbutadiene) diol |
| | | $M_n$ = 3500, f = 1.86, Styrene content = 26% w, EW = 1882 |

TABLE 1-continued

Identification of Ingredients

| Component | Supplier | Description |
|---|---|---|
| EB DIOL D | SHELL | HO—EB—OH, a hydrogenated polybutadiene diol $M_n = 3300$, f = 1.92, 1,2-Bd = 53%, EW = 1720 |
| Isocyanate Crosslinkers | | |
| DESMODUR Z-4370 | Bayer | Polyisocyanate based on IPDI, 70% w in xylene, NCO EW = 365 |
| DESMODUR Z4470 | Bayer | Polyisocyanate based on IPDI, 70% w in Aromatic 100, NCOEW = 359 |
| DESMODUR N-3390 | Bayer | Polyisocyanate based on HDI, 90% w in butyl acetate/Aromatic 100, NCO EW = 216 |
| DESMODUR N-3400 | Bayer | Polyisocyanate based on HDI, 100% solids, NCO EW = 193 |
| MONDUR MR | Bayer | Polyisocyanate based on MDI, 100% solids, NCO EW = 134 |
| Reinforcing Agents | | |
| PEP | Aldrich | 2-Ethyl-1,3-hexane diol, mp = −40° C. |
| BEPD | Perstorp | 2-Ethyl-2-butyl-1,3-propane diol, mp = 39° C. |
| NPG | Eastman | 2,2-Dimethyl-1,3-propane diol, mp = 125° C. |
| TMPD | Eastman | 2,2,4-Trimethyl-1,3-pentane diol, mp = 46–55° C. |
| HBPA | Shell | Hydrogenated bis-phenol-A, mp = 165° C. |
| HDD | Henkel | Dimer Diol, HO—$C_{36}$—OH, Eq Wt = 269, liquid @ 25° C. |
| BDO | DuPont | 1,4-Butane diol, mp = 19° C. |
| ZOLDINE RD-4 | Angus | Oxazolidine-aldimine type reactive diluent, EW = 89, functionality = 3, liquid (amino alochol) |
| Polyol | | |
| DESMOPHEN 670-80A | Bayer | Saturated polyester polyol, 80% w in n-butyl acetate, OH EW = 500 |
| Catalyst | | |
| DABCO T-12 | Air Products | Dibutyl tin dilaurate |
| Solvents | | |
| Isobutyl acetate | Eastman | Urethane grade, bp = 112–119° C. |
| Xylene | Aldrich | Bp = 137–144° C. |
| Aromatic 100 | Exxon | Aromatic solvent, boiling range 185–206° C. |
| Methyl amyl ketone | Aldrich | Bp = 150 ° C. |
| Stabilizers | | |
| IRGANOX 1076 | CIBA | Hindered phenol type antioxidant |
| TINUVIN 400 | CIBA | Triazine-type UV absorber |
| TINUVIN 123 | CIBA | Hindered amine type UV stabilizer |
| Pigment | | |
| TiPure R-706 | DuPont | Rutile titanium dioxide white pigment, 0.27 micron particle siz |
| Silane | | |
| SILQUEST A-189 | OSI | Mercaptopropyltrimethoxysilane |

EXAMPLE 1

Table 2 shows results of blending EB DIOL A and PEP diol on the A side of 2-component polyurethane coatings.

TABLE 2

2-Component Coatings at 1.1 NCO/OH with the "A" Side Modified

| "A" Side Composition, pbw* | Blend A-1 | Blend A-2 | Blend A-3 | Blend A-4 | Blend A-5 |
|---|---|---|---|---|---|
| EB DIOL A | 1700 | 612 | 281 | 119 | 70 |
| PEP diol | | 47 | 61 | 68 | 70 |
| DABCO T-12 | 2.0 | 0.9 | 0.6 | 0.5 | 0.4 |
| Xylene | 729 | 262 | 120 | 51 | 30 |
| "A" Side Solution | | | | | |
| EB DIOL A/PEP | 100/0 | 93/7 | 82/18 | 64/36 | 50/50 |
| Clarity | clear | sl haze | sl haze | | |
| Phase Stability | stable | stable | stable | separated | separated |
| "B" Side | | | | | |

TABLE 2-continued

2-Component Coatings at 1.1 NCO/OH with the "A" Side Modified

| Composition, pbw | | | | | |
|---|---|---|---|---|---|
| DESMODUR Z-4370 | 401.5 | 401.5 | 401.5 | 401.5 | 401.5 |
| Dry A + B Coating Composition, % w | C-1 | C-2 | C-3 | C-4 | C-5 |
| EB diol | 85.7 | 65.1 | 45.0 | 25.4 | 16.5 |
| PEP diol | | 5.0 | 9.8 | 14.5 | 16.6 |
| Triisocyanate | 14.2 | 29.9 | 45.1 | 60.0 | 66.7 |
| Catalyst | 0.1 | 0.1 | 0.1 | 0.1 | 0.1 |
| Properties[a] on Steel (QD412) | | | | | |
| Thickness, mil | 1.1 | 1.2 | 1.4 | | |
| Pencil Hardness | 4B | H | 2B | | |
| Crosshatch | 0 | 0 | 0 | | |

TABLE 2-continued

2-Component Coatings at 1.1 NCO/OH with the "A" Side Modified

Adhesion
General Appearance

| Tack | slight | none | none |
|---|---|---|---|
| Gloss | high | high | high |
| Clarity | clear | clear | hazy |
| Adhesion to Steel | v poor | v poor | v poor |

*part by weight - same in all tables
[a]Properties after 1 week cure at room temperature.

Coating C-1 is simply the EB diol cured with the triisocyanate at a small NCO excess (1.1/1 NCO/OH), giving a coating containing about 85% w EB diol. Since the A side blend A-1 is simply a solution of EB diol and catalyst in xylene, it is clear and phase stable. When mixed with the B side, the composition cures to give a clear, glossy polyurethane film which feels slightly tacky and has poor adhesion to steel. Coatings C-2 and C-3 are compositions which incorporate 5% w and 9.8% w PEP diol in the final, dry, cured coating. The PEP diol and the resulting increase in isocyanate necessary to maintain 1.1/1 NCO/OH cause the EB diol concentrations to drop to 65% w and 45% w, respectively. The A side blends, A-2 and A-3, of EB diol, PEP diol and catalyst in xylene are phase stable but slightly hazy. When mixed with the B side, they give coatings which are somewhat harder and so are not tacky to the touch. Both are nice, glossy coatings which have poor adhesion to steel. Coating C-2 is clear but Coating C-3 is hazy. In Coatings C-4 and C-5, enough PEP diol was included on the A side to give cured coatings containing 25% w and 16% w EB diol, respectively. Because of the incompatibility of the EB diol and PEP diol, the A side blends A-4 and A-5 were not phase stable and separated upon standing. Therefore, no coatings were cast from these compositions. The examples in Table 2 show the limited ability to combine the polydiene diol and the reinforcing diol in a simple physical blend without using the partial reaction as taught in this invention.

EXAMPLE 2

The other approach to making coatings with these three components is to incorporate either the EB diol or PEP diol with the isocyanate on the B side instead of mixing them on the A side. If the PEP diol was incorporated into the B side, the B side would become even more polar and more likely to be incompatible with the EB diol when the A and B sides are mixed. Therefore, the EB diol was incorporated into the B side. Thus, the B side contains the triisocyanate, the EB diol (which will become capped with triisocyanate), catalyst and solvent. The A side is simply PEP diol.

Table 3 shows formulations which demonstrate this approach of modifying the isocyanate with EB diol on the B side.

TABLE 3

2-Component Coatings at 1.1 NCO/OH with the "B" Side Modified

| "B" Side Composition, pbw | Blend B-1 | Blend B-2 | Blend B-3 | Blend B-4 | Blend B-5 |
|---|---|---|---|---|---|
| EB DIOL A | 1700 | 612 | 281 | 119 | 70 |
| DESMODUR Z-4370 | 401.5 | 401.5 | 401.5 | 401.5 | 401.5 |
| DABCO T-12 | 2.0 | 0.9 | 0.6 | 0.5 | 0.4 |

TABLE 3-continued

2-Component Coatings at 1.1 NCO/OH with the "B" Side Modified

| Xylene "B" Side Solution | 729 | 262 | 120 | 51 | 30 |
|---|---|---|---|---|---|
| NCO/OH | 1.1 | 3.1 | 6.7 | 15.7 | 26.8 |
| Clarity | | | v hazy | v hazy | v hazy |
| Phase Stability | not made | not made | stable | stable | stable |

"A" Side Composition, pbw

| PEP diol | 0 | 47 | 61 | 68 | 70 |
|---|---|---|---|---|---|

| Dry A + B Coating Composition, % w | C-1 | C-2 | C-3 | C-4 | C-5 |
|---|---|---|---|---|---|
| EB diol | 85.7 | 65.1 | 45.0 | 25.4 | 16.5 |
| PEP diol | | 5.0 | 9.8 | 14.5 | 16.6 |
| Triisocyanate | 14.2 | 29.9 | 45.1 | 60.0 | 66.7 |
| Catalyst | 0.1 | 0.1 | 0.1 | 0.1 | 0.1 |

Properties[a] on Steel (QD412)

| Gloss | | | dull | dull | dull |
|---|---|---|---|---|---|
| Clarity | | | opaque | opaque | opaque |
| Adhesion to Steel | | | brittle | brittle | brittle |
| Mar Resistance | | | poor | poor | poor |

[a]Properties after 1 week cure at room temperature. Solutions gelled quickly when PEP was mixed into "B" Side solutions.

B side blends B-1 and B-2 could not be made at this solids content because the EB diol and triisocyanate on the B side are close enough to stoichiometric that high MW molecules would form and viscosities would be very high. Stable B side blends could be made with B-3, B-4 and B-5 but they were very hazy. When PEP diol was mixed into these B side blends, they gelled fairly quickly and their coatings were opaque and had very poor gloss.

The poor success found when combining the EB diol and PEP diol on the A side or combining the EB diol and triisocyanate on the B side suggests that mutual incompatibility of the EB diol/reinforcing diol/crosslinker is a significant problem in polyurethane compositions. Therefore, in accordance with the invention described herein, further work was done on cooks in resin kettles to find conditions of limited reaction which would yield phase stable resins which could be cured to give coatings having better hardness and gloss and adhesives having better shear and tear strength.

Resin Cook Technology

In these resin cooks, polyurethane polymers are being synthesized by reaction of the EB diol, reinforcing diol and isocyanate in the presence of a small amount of catalyst and some solvent to control viscosity. The extent of reaction among the EB diol, the reinforcing diol and crosslinker must be carefully controlled. There must be enough reaction to overcome the incompatibility of the components. But there must not be so much reaction that high molecular weight molecules are formed, leading to high viscosities.

When using blocked isocyanates as crosslinkers, it is relatively easy to control the extent of reaction because the reaction can be stopped at any point by merely cooling the resin to room temperature or adding a little n-butanol which suppresses the reaction and becomes part of the solvent system. This works well for one component resins intended for bake cured coatings. However, cooks of resins intended for two component, ambient temperature cure compositions cannot be stopped and will continue until either the OH groups or the NCO groups are consumed. Thus, the only method to control the extent of reaction among the EB diol, reinforcing diol and isocyanate is to control stoichiometry. This is illustrated as follows.

Table 4 shows recipes calculated for 2-component polyurethanes based on the EB diol, BEPD diol and DESMODUR Z-4370. The top entry, containing no BEPD diol, uses 1 equivalent of OH reacting with 1 equivalent of NCO. Since DESMODUR Z-4370 is a triisocyanate, for every molecule of EB diol, there is 2/3 molecule of triisocyanate. Thus, on a weight basis, the formulation is 87% w (percent by weight) EB diol and 13% w triisocyanate. Progressing down the table, the concentration of EB diol in the composition is reduced by incorporating BEPD as the reinforcing diol and increasing the triisocyanate to maintain 1/1 NCO/OH. For example, to make a polyurethane containing 40% w EB diol, one calculates that 12% w BEPD diol is required. The amount of triisocyanate required in the formulation to react with all of the OH's is 48% w. Thus, for each molecule of EB diol, there would be 7 molecules of reinforcing diol and 5.3 molecules of triisocyanate.

TABLE 4

Recipes for Thermoset Polyurethane Compositions (1/1 NCO/OH)

| Component | Eq Wt |
|---|---|
| EB Diol | 1700 |
| BEPD Diol | 80 |
| DESMODUR Z-4370 | 365 |

| Composition (1/1/NCO/OH), % w | | | EB diol/ | Composition (1/1 NCO/OH), mole | | |
|---|---|---|---|---|---|---|
| EB diol | BBPD | Triiso | BEPD, w/w | EB diol | BEPD | Triiso |
| 87.0 | 0.0 | 13.0 | 100/0 | 1 | 0 | 0.67 |
| 80.0 | 1.8 | 18.2 | 98/2 | 1 | 0.5 | 1.0 |
| 70.0 | 4.3 | 25.7 | 94/6 | 1 | 1.4 | 1.6 |
| 60.0 | 6.9 | 33.1 | 90/10 | 1 | 2.7 | 2.5 |
| 50.0 | 9.4 | 40.6 | 84/16 | 1 | 4.4 | 3.6 |
| 40.0 | 12.0 | 48.0 | 77/23 | 1 | 7.0 | 5.3 |
| 30.0 | 14.6 | 55.5 | 67/33 | 1 | 11.3 | 8.2 |
| 20.0 | 17.1 | 62.9 | 54/46 | 1 | 19.9 | 14.0 |

To make this polyurethane containing 40% w EB diol as a 2-component system, one would normally dissolve the EB diol and BEPD diol on the A side and use the triisocyanate as the B side. However, incompatibility of the EB diol and BEPD diol in the solution on the A side may cause phase separation of the solution or it may give hazy coatings or coatings which have poor gloss. The approach taken in this work to overcome this incompatibility is to do a limited reaction among the three components to synthesize either an OH terminated polyurethane resin or a NCO terminated polyurethane resin which can subsequently be used in a 2-component system or in a moisture cure system.

FIG. 1 shows a plot of the concentration of EB diol in the final cured polyurethane composition versus stoichiometry of the EB diol, reinforcing diol and triisocyanate mixture. The vertical line in the center of the figure is the 1/1 NCO/OH point. Compositions falling on this line have an equal number of OH's and NCO's. These are compositions for crosslinked polyurethanes having maximum crosslink density. Compositions to the left of this center line contain less than the stoichiometric amount of NCO. Therefore, these compositions can give OH terminated polyurethane resins which can be subsequently used as the A side of a two component system. Compositions to the right of this center line contain less than the stoichiometric amount of OH. Therefore, these compositions can give NCO terminated polyurethane resins which can be subsequently used as the B side of a 2-component system or as a moisture cured system.

There are four regions shown in FIG. 1. Region 4 shows compositions which are close enough to stoichiometric that they will gel in a two component system. Compositions in Region 3 are far enough away from stoichiometric that they will not gel. However, they are close enough to stoichiometric that when mixed together in solution, high molecular weight polyurethane molecules will be formed, leading to high solution viscosities. Compositions in Region 3 will not be of use because of their high viscosity. Region 2 indicates compositions which are of use in this work and which are within the scope of this invention. The stoichiometry is sufficient to give enough reaction to give clear, phase stable resins. Yet the compositions are far enough away from stoichiometric that the polyurethane molecules which form are low enough in molecular weight that viscosities are tolerable. In Region 1, the extent of reaction is too low to give clear, phase stable resins. In Region 1 on the left side, there is not enough triisocyanate to join enough of the EB diol and reinforcing diol molecules together to give phase stable resins. In Region 1 on the right side, there is such a large excess of triisocyanate that again the EB diol and reinforcing diol molecules do not become joined together through the triisocyanate molecules. Thus, compositions in Region 1 are also not of use in this work.

The boundaries of the regions in FIG. 1 are not fixed and distinct. The stoichiometry required to reach Region 2 will depend to some extent on the particular ingredients, especially on the particular reinforcing diol used in the composition. The positions of the boundaries of Region 2 are best estimates from the data presented herein for the EB diols and reinforcing diols used herein.

The procedure for conducting the resin cooks depended upon whether the resin was a hydroxyl terminated polyurethane or an isocyanate terminated polyurethane. For an OH terminated resin, it was found that the best procedure (Procedure 1) was to charge the diols, catalyst and about 70% of the solvent to the resin kettle first, heat to 80° C. under a dry nitrogen purge and slowly add the isocyanate, diluted with 30% of the solvent. For an NCO terminated resin containing just EB diol and triisocyanate, the best procedure (Procedure 2) was to charge the isocyanate, catalyst and about 70% of the solvent to the kettle first, heat to 80° C. under a dry nitrogen purge and slowly add the diol, dissolved in 30% of the solvent. For an NCO terminated resin containing EB diol, reinforcing diol and triisocyanate, the best procedure (Procedure 3) was to charge the EB diol, reinforcing diol, isocyanate and solvent to the resin kettle first, heat to 80° C. under a dry nitrogen purge and add catalyst as a 10% w solution in solvent. In all three procedures, the resin was held at 80° C. for about another 2 to 4 hours after all the ingredients had been added. It was then poured into a jar for later use.

Synthesis of Hydroxyl Terminated Polyurethane Resins

EXAMPLE 3

Effect of NCO/OH—Table 5 shows examples of the synthesis of hydroxyl terminated polyurethane resins for use on the A side of a two component polyurethane. These resins contain mixtures of EB diol and reinforcing diol. To overcome the incompatibility between these two components, they are reacted together with the appropriate amount of triisocyanate in a resin kettle to give the "A" Side Resin Cook. The amount of triisocyanate used in the cook is expressed by the NCO/OH ratio.

TABLE 5

Effect of NCO/OH Ratio in EB DIOL/Reinforcing Diol/4370 Resin Cook

| "A" Side Resin Cook Composition, pbw | Blend A-1 | Cook A-2 | Cook A-4 | Cook A-5 | Cook A-6 | Cook A-7 | Cook |
|---|---|---|---|---|---|---|---|
| EB DIOL B | 48 | 38.9 | 28.2 | 26.4 | 32.7 | 28.2 | 15.8 |
| TMPD diol | 12 | 9.7 | 7.1 | 6.6 | | | 10.5 |
| BEPD diol | 8.2 | 7.1 | | | | | |
| DESMODUR Z-4370 | | 11.4 | 24.7 | 27 | 19.1 | 24.7 | 33.6 |
| DABCO T-12 | 0.06 | 0.06 | 0.06 | 0.06 | 0.06 | 0.06 | 0.06 |
| Isobutyl acetate | 40 | 40 | 40 | 40 | 40 | 40 | 40 |
| Cooked Resin Properties | | | | | | | |
| EB diol B/Reinforcing diol | 80/20 | 80/20 | 80/20 | 80/20 | 80/20 | 80/20 | 60/40 |
| NCO/OH | | 0.2 | 0.6 | 0.7 | 0.4 | 0.6 | 0.6 |
| Appearance | not made | separated | v sl haze | v sl haze | separated | v sl haze | clear |
| "B" Side Composition pbw | | | | | | | |
| DESMODUR Z-4370 | 77.0 | 51.1 | 20.8 | 12.7 | 33.4 | 21.2 | 28.0 |
| Dry A + B Coating Composition, % w | C-1 | C-2 | C-3 | C-4 | C-5 | C-6 | C-7 |
| EB diol | 42.1 | | 42.0 | 43.4 | | 41.8 | 22.7 |
| Reinforcing diol | 10.5 | | 10.6 | 10.8 | | 10.5 | 15.1 |
| Triisocyanate | 47.3 | | 47.4 | 45.7 | | 47.6 | 62.1 |
| Catalyst | 0.053 | | 0.089 | 0.099 | | 0.089 | 0.086 |
| Properties[a] of Steel (QD412) | | | | | | | |
| Thickness, mil | | | 1.1 | 1.2 | | | |
| Rocker Hardness, rocks | | | 10 | 11 | | | |
| Pencil Hardness | | | H | H | | | |
| MEK Rubs | | | 6 | 12 | | | |
| Crosshatch Adhesion | | | 0 | 3 | | | |
| Properties[a] on TPO (DEXFLEX 777) | | | | | | | |
| Rocker Hardness, rocks | | | 12 | 15 | | | |
| Pencil Hardness | | | <4B | <4B | | | |
| MEK Rubs | | | 29 | 13 | | | |
| Crosshatch Adhesion | | | 0 | 0 | | | |
| General Appearance | | | | | | | |
| Tack | | | none | none | none | | |
| Gloss | | | good | good | fair | | |
| Clarity | | | clear | clear | clear | | |
| Adhesion to Steel | | | good | good | fair | flakes off | |
| Adhesion to TPO | | | poor | poor | poor | flakes off | |
| Mar Resistance | | | | poor | poor | brittle | |
| Film Characteristics | | | good | good | | cracks | |

[a]Properties after 1 week cure/dry at room temperature.

Results on Cooks A-2 and A-5 show that, at 80/20 EB diol/reinforcing diol, triisocyanate at 0.2 and 0.4 NCO/OH does not give enough reaction to yield phase stable resins. Increasing the triisocyanate to 0.6 NCO/OH (A-3 and A-6) gives enough reaction to yield very nice, phase stable resins. Triisocyanate at 0.7 NCO/OH (A-4) gives a nice resin but viscosity at 60% w in isobutyl acetate is quite high.

These phase stable hydroxyl functional polyurethane resins can be cured as a two component system by mixing with more triisocyanate at about a 1.0 to 1.1 NCO/OH. Results in Table 5 show that resins using an 80/20 EB diol/reinforcing diol (yielding cured coatings containing about 42% w EB diol) give cured coatings, C-3, C-4 and C-6, which have fair to good gloss, good clarity and good film characteristics (meaning that they are flexible, fairly tough films). Results also show that Coating C-7, which used 60/40 EB diol/reinforcing diol (yielding cured coatings containing about 23% w EB diol), gave a cured coating which was brittle. Thus, useful compositions will contain at least about 30% w EB diol in the final cured coating in order to obtain good flexibility and toughness.

EXAMPLE 4

Table 6 shows hydroxyl functional resins made with much lower concentrations of reinforcing diol (NPG in these examples).

TABLE 6

Effect of NCO/OH Ratio in EB DIOL/NPG/4370 Resin Cook

| "A" Side Resin Cook Composition, pbw | Cook A-1 | Cook A-2 | Cook A-3 |
|---|---|---|---|
| EB DIOL B | 54.3 | 45.5 | 37.9 |
| NPG diol | | 1.9 | 3.1 |
| DESMODUR Z-4370 | 5.7 | 12.6 | 19 |
| DABCO T-12 | 0.06 | 0.06 | 0.06 |
| Isobutyl acetate | 40 | 40 | 40 |
| Cooked Resin Properties | | | |
| EB DIOL B/NPG | 100/0 | 96/4 | 92/8 |

TABLE 6-continued

Effect of NCO/OH Ratio in EB DIOL/NPG/4370 Resin Cook

| NCO/OH | 0.4 | 0.5 | 0.6 |
|---|---|---|---|
| Appearance | clear | clear | cloudy |
| "B" Side Composition, pbw | | | |
| DESMODUR Z-4370 | 9.4 | 13.9 | 13.9 |
| Dry A + B Coating Composition, % w | C-1 | C-2 | C-3 |
| EB diol | 83.6 | 69.0 | 59.1 |
| NPG | | 2.9 | 4.8 |
| Triisocyanate | 16.3 | 28.1 | 36.0 |
| Catalyst | 0.092 | 0.091 | 0.094 |
| Properties[a] on Steel (QD412) | | | |
| MEK Rubs | >100 | 80 | >100 |
| Crosshatch Adhesion | 0 | 0 | 1 |
| Properties[a] on TPO (DEXFLEX 777) | | | |
| MEK Rubs | 54 | >100 | >100 |
| Crosshatch Adhesion | 0 | 0 | 0 |
| General Appearance | | | |
| Tack | slight | none | none |
| Gloss | high | high | high |
| Clarity | clear | clear | clear |
| Adhesion to Steel | poor | poor | fair |
| Adhesion to TPO | poor | poor | v poor |
| Mar Resistance | poor | v good | fair |
| Film Characteristics | elastic | elastic | tough |
| Surface | nice | fine cracks | fine cracks |

[a]Properties after 1 week cure/dry at room temperature.
[b]Could be cut through the film with a fingernail.

Cook A-1, which contains no NPG, shows that the EB diol can be prereacted with triisocyanate at 0.4 NCO/OH with no major viscosity penalty. However, the coating, C-1, made with Cook A-1 and cured with more triisocyanate at 1.1 NCO/OH, has the same properties as a simple two component blend of EB diol as the A side and all of the triisocyanate as the B side. When EB diol/triisocyanate resin was cooked at 0.7 NCO/OH, the reaction mixture became so thick in about 20 minutes that it climbed the stirrer shaft as the resin approached gellation.

Coating C-2 in Table 6 uses only a small amount of NPG as the reinforcing diol. The A Side Resin Cook A-2 made at 0.5 NCO/OH was phase stable. The properties of Coating C-2 made with Cook A-2 cured with more triisocyanate at 1.1 NCO/OH show that even this small amount of reinforcing diol was sufficient to eliminate the slight tack in Coating C-1 and to improve the mar resistance to the point where one could not easily cut through the coating with one's fingernail. The A Side Resin Cook A-3 at 0.6 NCO/OH was stable but hazy. However, when cured with more triisocyanate, the coating, C-3, was clear.

EXAMPLE 5

Effect of Reinforcing Diol Type—A Side Resin Cooks were prepared with a series of reinforcing diols in two formulations, one in which the final cured coating at 1.1 NCO/OH contained about 59% w EB diol and one in which the final coating contained about 39% w EB diol. Results are presented in Tables 7 and 8, respectively.

TABLE 7

Effect of Reinforcing Diol Type in EB DIOL/Reinforcing Diol/4370 Resin Cook

| Reinforcing Diol | PEP | BEPD | TMPD | HBPA | NPG | BDO |
|---|---|---|---|---|---|---|
| "A" Side Resin Cook | Cook | Cook | Cook | Cook | Cook | Cook |
| Composition, pbw | A-1 | A-2 | A-3 | A-4 | A-5 | A-6 |
| EB DIOL B | 37.8 | 37.8 | 37.8 | 37.6 | 37.9 | 37.9 |
| Reinforcing Diol | 4.1 | 4.3 | 4.1 | 5.8 | 3.1 | 2.7 |
| DESMODUR Z-4370 | 18.1 | 17.8 | 18.1 | 16.6 | 19 | 19.3 |
| DABCO T-12 | 0.06 | 0.06 | 0.06 | 0.06 | 0.06 | 0.06 |
| Isobutyl acetate | 40 | 40 | 40 | 40 | 40 | 40 |
| Cooked Resin Properties | | | | | | |
| EB Diol B/Reinforcing diol | 90/10 | 90/10 | 90/10 | 87/13 | 92/8 | 93/7 |
| NCO/OH | 0.6 | 0.6 | 0.6 | 0.6 | 0.6 | 0.6 |
| Appearance | clear | clear | clear | clear | clear | gelled |
| "B" Side Composition, pbw | | | | | | |
| DESMODUR Z-4370 | 13.3 | 13.1 | 13.3 | 12.1 | 13.9 | — |
| Dry A + B Coating Composition, % w | C-1 | C-2 | C-3 | C-4 | C-5 | |
| EB diol | 59.1 | 59.3 | 59.1 | 59.1 | 59.1 | |
| Reinforcing diol | 6.4 | 6.7 | 6.4 | 9.1 | 4.8 | |
| Triisocyanate | 34.4 | 33.9 | 34.4 | 31.6 | 36.0 | |
| Catalyst | 0.094 | 0.094 | 0.094 | 0.094 | 0.094 | |
| Properties[a] on Steel (QD412) | | | | | | |
| Thickness, mil | 1.5 | 1.4 | 1.4 | 1.3 | 1.5 | |
| Rocker Hardness, rocks | 7 | 6 | 6 | 7 | 7 | |
| MEK Rubs | 26 | 26 | 22 | 24 | 31 | |
| Crosshatch Adhesion | 0 | 0 | 0 | 0 | 0 | |

TABLE 7-continued

Effect of Reinforcing Diol Type in EB DIOL/Reinforcing Diol/4370 Resin Cook

Properties[a] on TPO
(DEXFLEX 880)

| | | | | | |
|---|---|---|---|---|---|
| Rocker Hardness, rocks | 7 | 7 | 7 | 7 | 6 |
| MEK Rubs | 33 | 39 | 34 | 29 | 46 |
| Crosshatch Adhesion | 0 | 0 | 0 | 0 | 0 |
| General Appearance | | | | | |
| Tack | none | none | none | none | none |
| Gloss | high | high | high | high | high |
| Adhesion to Steel | poor | poor | poor | poor | poor |
| Adhesion to TPO | poor | poor | poor | poor | poor |
| Mar Resistance | fair | fair | poor | v poor | fair |
| Film Characteristics | elastic | elastic | elastic | elastic | elastic |

[a]Properties after 1 week cure/dry at room temperature.

Results in Table 7 show that all of the reinforcing diols except BDO gave clear, phase stable, hydroxyl terminated resins when cooked with triisocyanate at 0.6 NCO/OH. Properties of coatings cured with more triisocyanate at 1.1 NCO/OH show that all of the resins give coatings at 59% w EB diol which are nice, non-tacky, glossy, elastic films. In fact, differences among the resins are quite small.

The results in Table 8 show that again, clear phase stable resins could be made with all the reinforcing diols except BDO at 0.6 to 0.7 NCO/OH. The cured coatings containing 39% w EB diol were all quite hard and, in the case of TMPD and HBPA, somewhat brittle.

TABLE 8

Effect of Reinforcing Diol Type in EB DIOL/Reinforcing Diol/4370 Resin Cook

| Reinforcing Diol | PEP | BEPD | TMPD | HBPA | BDO | BDO |
|---|---|---|---|---|---|---|
| "A" Side Resin Cook | Cook | Cook | Cook | Cook | Cook | Cook |
| Composition, pbw | A-1 | A-2 | A-3 | A-4 | A-5 | A-6 |
| EB DIOL B | 24.0 | 25.7 | 24.0 | 24.0 | 24 | 25.9 |
| Reinforcing Diol | 7.0 | 8.1 | 7.0 | 10.1 | 4.7 | 5.1 |
| DESMODUR Z-4370 | 29.0 | 26.2 | 29.0 | 25.9 | 31.3 | 28.9 |
| DABCO T-12 | 0.06 | 0.06 | 0.06 | 0.06 | 0.06 | 0.06 |
| Isobutyl acetate | 40 | 40 | 40 | 40 | 40 | 40 |
| Cooked Resin Properties | | | | | | |
| EB Diol B/Reinforcing diol | 77/23 | 76/24 | 77/23 | 70/30 | 84/16 | 84/16 |
| NCO/OH | 0.7 | 0.6 | 0.7 | 0.7 | 0.7 | 0.6 |
| Appearance | clear | clear | clear | clear | gelled | separated |
| "B" Side Composition, pbw | | | | | | |
| DESMODUR Z-4370 | 13.7 | 19.2 | 13.7 | 12.2 | — | — |
| Dry A + B Coating Composition, % w | C-1 | C-2 | C-3 | C-4 | | |
| EB diol | 39.4 | 39.2 | 39.4 | 39.4 | | |
| Reinforcing diol | 11.5 | 12.3 | 11.5 | 16.6 | | |
| Triisocyanate | 49.0 | 48.4 | 49.0 | 43.9 | | |
| Catalyst | 0.098 | 0.091 | 0.098 | 0.099 | | |
| Properties[a] on Steel (QD412) | | | | | | |
| Rocker Hardness, rocks | 14 | 17 | 13 | 18 | | |
| MEK Rubs | <20 | >100 | <20 | <20 | | |
| Crosshatch Adhesion | 5 | 5 | 2 | 4 | | |
| Properties[a] on TPO (DEXFLEX 777) | | | | | | |
| Rocker Hardness, rocks | 11 | 18 | 12 | 14 | | |
| MEK Rubs | 42 | >100 | <20 | <20 | | |
| Crosshatch Adhesion | 0 | 0 | 0 | 0 | | |
| General Appearance | | | | | | |
| Mar Resistance | v poor | v poor | v poor | v poor | | |
| Film Characteristics | | | cracked | cracked | | |

[a]Properties after 1 week cure/dry at room temperature.

All of these hydroxyl functional resins were made with Procedure 1 described above using vacuum dried diols except the two made with HBPA. Vacuum drying of HBPA is difficult because of its high melting point and its tendency to sublime. Therefore, the following procedure was used to make the resins with HBPA. The EB DIOL B and HBPA were charged to the resin kettle and heated to 170° C. Dry nitrogen was purged through the kettle for 4 hours with stirring. The mass was cooled to about 100° C. and 70% of the isobutyl acetate was added. This was heated to 130° C., causing the solvent to reflux and wash the HBPA which had sublimed up on the kettle walls back into the reaction mass. This was cooled to 110° C. and catalyst was added. The isocyanate, diluted with 30% of the isobutyl acetate, was then added slowly with a dropping funnel over a 55 minute period. The mass was held for an additional 1.5 hours at 110° C. and then it was poured into a jar for later use.

EXAMPLE 6

Effect of Solvent Type—The results on Resin Cooks A-1 and A-2 in Table 9 show that cooks can be done satisfactorily using either isobutyl acetate or xylene as the solvent. Both solvents give resins which are clear and phase stable and, when cured with DESMODUR Z-4370, both give coatings, C-1 and C-2, having nearly identical properties.

TABLE 9

Effect of Solvent Type in EB DIOL/BEPD/4370 Resin Cook

| "A" Side Resin Cook Composition, pbw | Cook A-1 | Cook A-2 | Cook A-2 |
|---|---|---|---|
| EB DIOL B | 37.8 | 37.9 | 37.9 |
| BEPD diol | 4.3 | 3.1 | 3.1 |
| DESMODUR Z-4370 | 17.8 | 19.0 | 19.0 |
| DABCO T-12 | 0.06 | 0.06 | 0.06 |
| Isobutyl acetate | 40 | | |
| Xylene | | 40 | 40 |
| Cooked Resin Properties | | | |
| EB DIOL/BEPD | 90/10 | 90/10 | 90/10 |
| NCO/OH | 0.6 | 0.6 | 0.6 |
| Phase Stability/Clarity | clear | clear | clear |
| "B" Side Composition, pbw | | | |
| DESMODUR Z-4370 | 13.1 | 13.1 | none |
| Dry A + B Coating Composition, % w | C-1 | C-2 | C-3 |
| EB diol | 59.3 | 59.7 | 69.7 |
| BEPD | 6.7 | 4.9 | 5.7 |
| Triisocyanate | 33.9 | 35.4 | 35.0 |
| Catalyst | 0.094 | 0.094 | 0.110 |

TABLE 9-continued

Effect of Solvent Type in EB DIOL/BEPD/4370 Resin Cook

| Properties[a] on Steel (QD412) | | | |
|---|---|---|---|
| Thickness, mil | 1.4 | 1.2 | 1 |
| Rocker Hardness, rocks | 6 | 5 | 0 |
| MEK Rubs | 26 | 19 | 0 |
| Crosshatch Adhesion | 0 | 0 | 0 |
| Properties[a] on TPO (DEXFLEX 777) | | | |
| Rocker Hardness, rocks | 7 | 7 | 0 |
| MEK Rubs | 39 | 29 | 5 |
| Crosshatch Adhesion | 0 | 2 | 0 |
| General Appearance | | | |
| Tack | none | none | |
| Gloss | high | high | |
| Clarity | clear | clear | |
| Adhesion to Steel | poor | poor | |
| Adhesion to TPO | poor | poor | |
| Mar Resistance | fair | fair | |
| Film Characteristics | elastic | elastic | |

[a]Properties after 1 week cure/dry at room temperature.

Coating C-3 in Table 9 offers interesting information about the characteristics of the hydroxyl terminated polyurethane resin which was made in the cook using xylene. In this sample, the resin cook itself was cast without adding the rest of the DESMODUR Z-4370 required to give a crosslinked coating at 1.0 NCO/OH. The uncured resin cook gives a dry coating having surprising integrity. Although the coating film is not very strong, nonetheless it has enough strength to be peelable from the steel substrate and it is not tacky. However, as shown by the properties in Table 9, it has very soft hardness and poor MEK rubs resistance. Comparison of Coatings C-2 and C-3 shows that crosslinking the hydroxyl terminated polyurethane resin clearly increases hardness and MEK resistance.

Synthesis of Isocyanate Terminated Polyurethane Resins

Effect of OH/NCO—Table 10 shows examples of polyurethane resins made with EB diol, reinforcing diol and a molar excess of triisocyanate, giving polyurethanes which are terminated with isocyanate groups. These resins can be used as the B side of two component polyurethanes or they can be used as one-component, moisture cure systems. The well known mechanism of moisture cure is that some of the isocyanates react with water in the atmosphere. This generates $CO_2$ and converts the isocyanate to an amine. These amines then react quickly with isocyanates which have not yet reacted with water, generating urea linkages and curing the composition.

TABLE 10

Effect of EB Diol Concentration in EB DIOL/BEPD/4370 Resin Cook for Moisture Cure

| "B" Side Resin Cook Composition, pbw | Cook B-1 | Cook B-2 | Cook B-3 | Cook B-4 | Cook B-5 | Cook B-6 | Cook B-7 | Cook B-8 |
|---|---|---|---|---|---|---|---|---|
| EB DIOL B | 27.97 | 30.18 | 23.15 | 23.23 | 18.4 | 18.45 | 18.54 | 13.95 |
| BEPD diol | | | 0.59 | 0.93 | 1.16 | 1.57 | 2.15 | 2.17 |
| DESMODUR Z-4370 | 22.03 | 19.82 | 26.26 | 25.84 | 30.44 | 29.98 | 29.31 | 33.88 |
| DABCO T-12 | 0.05 | 0.05 | 0.05 | 0.05 | 0.05 | 0.05 | 0.05 | 0.05 |
| Isobutyl acetate | 50 | 50 | 50 | 50 | 50 | 50 | 50 | 50 |
| Cooked Resin Properties | | | | | | | | |
| EB Diol B/BEPD | 100/0 | 100/0 | 97/3 | 96/4 | 94/6 | 92/8 | 90/10 | 87/13 |
| NCO/OH | 3.0 | 2.5 | 3.0 | 2.5 | 3.0 | 2.5 | 2.0 | 2.5 |

TABLE 10-continued

Effect of EB Diol Concentration in EB DIOL/BEPD/4370 Resin Cook for Moisture Cure

| OH/NCO | 0.33 | 0.40 | 0.33 | 0.40 | 0.33 | 0.40 | 0.50 | 0.40 |
|---|---|---|---|---|---|---|---|---|
| Appearance | clear | clear | clear | clear | clear | clear | clear | clear |
| "A" Side Composition, pbw | | | | | | | | |
| Water | $H_2O$ | $H_2O$ | $H_2O$ | $H_2O$ | $H_2O$ | $H_2O$ | $H_2O$ | $H_2O$ |
| Dry A + B Coating | | | | | | | | |
| Composition, % w | C-1 | C-2 | C-3 | C-4 | C-5 | C-6 | C-7 | C-8 |
| EB diol | 64.4 | 68.4 | 54.9 | 54.9 | 45.0 | 44.9 | 44.9 | 35.0 |
| BEPD | 0.0 | 0.0 | 1.4 | 2.2 | 2.8 | 3.8 | 5.2 | 5.4 |
| Triisocyanate | 35.5 | 31.5 | 43.6 | 42.8 | 52.1 | 51.1 | 49.7 | 59.5 |
| Catalyst | 0.1 | 0.1 | 0.1 | 0.1 | 0.1 | 0.1 | 0.1 | o*.1 |
| Properties[a] on Steel (QD412) | | | | | | | | |
| Thickness, mil | 1.1 | 1.2 | 1.0 | 1.1 | 1.2 | 1.2 | 1.2 | 1.3 |
| Rocker Hardness, rocks | 7 | 5 | 12 | 13 | 16 | 18 | 17 | 23 |
| MEK Rubs | 86 | 86 | 36 | 36 | 42 | 18 | 32 | 6 |
| Crosshatch Adhesion | 0 | 0 | 0 | 0 | 0 | 0 | 0 | 0 |
| Properties[a] on TPO (DEXFLEX 880) | | | | | | | | |
| Rocker Hardness, rocks | 7 | 5 | 9 | 10 | 9 | 10 | 11 | 11 |
| MEK Rubs | >100 | >100 | 60 | 52 | 61 | 40 | 30 | 25 |
| Crosshatch Adhesion | 3 | 3 | 0 | 0 | 0 | 0 | 0 | 0 |
| General Appearence | | | | | | | | |
| Tack | | | none | none | none | none | none | none |
| Gloss | good | good | good | good | good | good | good | good |
| Clarity | clear | clear | clear | clear | clear | clear | clear | clear |
| Adhesion to Steel | poor | poor | | | | | | |
| Adhesion to TPO | good | good | | | | | | |
| Mar Resistance | poor | poor | | | | | | |
| Film Characteristics | elastic | elastic | flexible | flexible | flexible | flexible | flexible | brittle |

[a]Properties after 1 week cure/dry at room temperature.

B Side Resin Cooks B-1 and B-2 in Table 10 are simply the triisocyanate containing less than a stoichiometric amount of EB diol. Cook B-1 was made at 0.33 OH/NCO. This corresponds to 2 moles of triisocyanate per mole of EB diol. So the average molecule in this resin is the EB diol which has been capped with one triisocyanate molecule on both ends. Cook B-2 was made at 0.4 OH/NCO, giving some chain extension and somewhat higher viscosity. After moisture cure, both Coatings C-1 and C-2 gave nice, clear, glossy, elastic coatings.

Procedure 2 (described above) was used to make these EB diol/triisocyanate resins. For example, to make Cook B-1 in Table 10, 77.10 grams of DESMODUR Z-4370, 108.40 grams of dried isobutyl acetate and 1.53 grams of a 10% w solution of DABCO T-12 in solvent were charged to a 500 ml resin kettle. The kettle was purged with dry nitrogen as it was heated to 80° C. The purge was stopped and 163.11 grams of a 60% w solution of EB DIOL B in isobutyl acetate was added dropwise over a 1 hour period. The mass was held at 80° C. another 1.5 hours and then was poured into ajar for later use.

Resin Cooks B-3 through B-8 in Table 10 were made using EB diol, BEPD diol and triisocyanate. Clear, phase stable resins could be made with these components at OH/NCO from about 0.3 to about 0.5. After moisture cure, all the compositions gave nice, glossy, clear coatings. Coatings C-3 through C-7 containing about 55% w and about 45% w EB diol had good flexibility but Coating C-8 containing 35% w EB diol was brittle after moisture cure.

Procedure 3 was used to make these EB diol/BEPD diol/triisocyanate resins. For example, to make Cook B-3 in Table 10, 64.42 grams of EB DIOL B, 4.09 grams of dried BEPD diol, 106.49 grams of DESMODUR Z-4370 and 162.13 grams of isobutyl acetate were charged to the resin kettle and stirring was begun. The kettle was heated to 80° C. under a dry nitrogen purge. The purge was then stopped and 14.31 grams of a 10% w solution of DABCO T-12 in solvent was added. The mass was held at 80° C. for 2 hours and was then poured into a jar for later use.

EXAMPLE 7

Table 11 presents formulations for isocyanate terminated polyurethane resins made with EB diol, NPG and triisocyanate. All three resins were made at 0.5 OH/NCO and all three were clear and phase stable. Instead of using these resins as one component moisture cure systems, they were used as the B side of a two component polyurethane, using a stoichiometric amount of ZOLDINE RD-4 ALDIMINE OXAZOLIDINE (from Angus Chemical), alpha,alpha,4,4-tetramethyl-2-(1-methylethyl)-N-(2-methyl-propylidene)-3-oxazolidineethanamine, as the A side curing agent.

TABLE 11

Effect of EB Diol Concentrafion in EB DIOL/NPG/4370 Resin Cook

| "B" Side Resin Cook Composition, pbw | Cook B-1 | Cook B-2 | Cook B-3 |
|---|---|---|---|
| EB DIOL B | 36.3 | 27.2 | 15.7 |
| NPG diol | 0.3 | 1.2 | 2.4 |
| DESMODUR Z-4370 | 23.4 | 31.6 | 41.9 |
| DABCO T-12 | 0.06 | 0.06 | 0.06 |
| Isobutyl acetate | 40 | 40 | 40 |

TABLE 11-continued

Effect of EB Diol Concentration in EB DIOL/NPG/4370 Resin Cook

| Cooked Resin Properties | | | |
|---|---|---|---|
| EB Diol B/NPG | 99/1 | 96/4 | 87/13 |
| NCO/OH | 2.0 | 2.0 | 2.0 |
| OH/NCO | 0.5 | 0.5 | 0.5 |
| Appearance | clear | clear | clear |
| "A" Side Composition, pbw | | | |
| Zoldine RD-4 | 2.9 | 3.8 | 5.1 |
| Dry A + B Coating Composition, % w | C-1 | C-2 | C-3 |
| EB diol | 64.9 | 50.0 | 29.9 |
| NPG | 0.5 | 2.2 | 4.6 |
| ZOLDINE RD-4 | 5.1 | 7.1 | 9.7 |
| Triisocyanate | 29.3 | 40.6 | 55.8 |
| Catalyst | 0.1 | 0.1 | 0.1 |
| Properties[a] on Steel (QD412) | | | |
| Rocker Hardness, rocks | 6 | 11 | 9 |
| MEK Rubs | >100 | >100 | >100 |
| Crosshatch Adhesion | 0 | 2 | 2 |
| Properties[a] on TPO (DEXFLEX 777) | | | |
| Rocker Hardness, rocks | 6 | 11 | — |
| MEK Rubs | 98 | >100 | flakes off |
| Crosshatch Adhesion | 0 | 0 | disbonded |
| General Appearance | | | |
| Tack | none | none | none |
| Gloss | high | high | high |
| Clarity | clear | clear | clear |
| Adhesion to Steel | poor | poor | fair |
| Adhesion to TPO | poor | v poor | came off |
| Mar Resistance | fair | fair | v poor[b] |
| Film Characteristics | elastic | tough | brittle |
| Surface | nice | nice | |

[a]Properties after 1 week cure/dry at room temperature.
[b]Coating was easily scratched like it had a weak surface layer.

The results in Table 11 show that all three formulations gave nice, glossy, clear coatings. Coating C-1 containing about 65% w EB diol was an elastic coating, Coating C-2 containing 50% w EB diol was a flexible, tough coating but Coating C-3 containing 30% w EB diol was brittle. These data show that the partially reacted isocyanate compositions are useful for making coatings as well as intermediates for making other coatings according to the process of this invention.

Procedure 3 is considered the best way to make the resins in Table 11. However, they were made by a different route in which the diols were charged to the reactor first and then isocyanate was added quickly with vigorous stirring. For example, the following procedure was use to prepare Resin Cook B-2 in Table 11. 95.23 grams of EB DIOL B, 4.38 grams of vacuum dried NPG, 2.09 grams of a 10% solution of DABCO T-12 and 140.03 grams of dried isobutyl acetate were charged to the kettle. The kettle was purged with dry nitrogen as it was heated to 70° C. The purged was stopped and 110.71 grams of DESMODUR Z-4370 was added quickly with vigorous stirring. This is a critical step because the isocyanate must become uniformly mixed into the polyol quickly to avoid chain extension as the mass progresses from OH rich to NCO rich. The mass was held for 6 hours at 70° C. and then it was poured into ajar for later use.

EXAMPLE 8

Table 12 shows two component coatings using an isocyanate terminated polyurethane based on the triisocyanate and EB diol as the B side and a solution of the reinforcing diols as the A side.

TABLE 12

Cure Isocyanate Terminated Resin with Reinforcing Diol Solution

| "B" Side Resin Cook Composition, pbw | | | Cook B-1 | | | |
|---|---|---|---|---|---|---|
| EB DIOL B | | | 27.97 | | | |
| DESMODUR Z-4370 | | | 22.03 | | | |
| DABCO T-12 | | | 0.05 | | | |
| Isobutyl acetate | | | 50 | | | |
| Cooked Resin Properties | | | | | | |
| NCO/OH | | | 3.0 | | | |
| OH/NCO | | | 0.33 | | | |
| Appearance | | | clear | | | |
| "A" Side Composition | | | | | | |
| Reinforcing diol | H₂O | BDO | TMPD | PEP | BEPD | HDD |
| Concentration, pbw | ambient | insoluble | insoluble | 5.9 | 6.4 | 21.5 |
| Dry A + B Coating Composition, % w | C-1 | C-2 | C-3 | C-4 | C-5 | C-6 |
| EB diol | 64.5 | | | 60.37 | 60.00 | 51.66 |
| Reinforcing diol | | | | 6.34 | 6.91 | 19.84 |
| Triisocyanate | 35.5 | | | 33.29 | 33.09 | 28.49 |
| Catalyst | 0.1 | | | 0.1 | 0.1 | 0.1 |
| Properties[a] on Steel (QD412) | | | | | | |
| Rocker Hardness, rocks | 6 | | | 8 | 8 | 2 |
| MEK Rubs | 41 | | | 20 | 18 | 20 |

TABLE 12-continued

Cure Isocyanate Terminated Resin with Reinforcing Diol Solution

| | | | | |
|---|---|---|---|---|
| Crosshatch Adhesion Properties[a] on TPO (DEXFLEX 777) | 0 | 0 | 0 | 0 |
| Rocker Hardness, rocks | 7 | 8 | 8 | 5 |
| MEK Rubs | 40 | 18 | 2.1 | 45 |
| Crosshatch Adhesion | 0–2 | 2 | 1–4 | 4 |
| General Appearance | | | | |
| Tack | none | none | none | v slight |
| Gloss | high | high | high | high |
| Clarity | clear | clear | clear | clear |
| Adhesion to Steel | v poor | v poor | poor | v poor |
| Adhesion to TPO | good[b] | poor | fair[b] | fair |
| Mar Resistance | fair | fair | fair | poor |
| Film Characteristics | elastic | elastic | elastic | elastic |

[a]Properties after 1 week cure/dry at room temperature.
[b]Adhesion was very good in spots but only fair to poor in spots. There was no pattern.

In Coating C-1, no reinforcing diol was used and the polyurethane was merely allowed to moisture cure. BDO and TMPD could not be used because they were not soluble at 50% w in isobutyl acetate. PEP, BEPD and HDD were all soluble and worked well. Results in Table 12 on Coating C-1 show that moisture cure gave a nice, glossy, clear, elastic coating. Coatings C-4 and C-5 cured with PEP and BEPD gave practically the same properties as the moisture cured coating. They would be suitable for curing the isocyanate terminated polyurethane in low humidity environments. Because of its relatively high hydroxyl equivalent weight, HDD did not serve as a reinforcing diol. Instead, it gave a much softer coating, C-6, than the moisture cured coating and imparted some tack to the coating.

EXAMPLE 9

Table 13 compares the approaches of curing a hydroxyl terminated resin using a triisocyanate versus curing an isocyanate terminated resin using a reinforcing diol, both systems having the same final cured coating composition.

TABLE 13

Comparison of Hydroxyl Terminated and Isocyanate Terminated Resins

| "A or B" Side Resin Cook Composition, pbw | Cook A-1 | Cook A-2 | Cook B-1 | Cook B-1 | Cook B-1 |
|---|---|---|---|---|---|
| EB DIOL B | 37.8 | 37.8 | 27.97 | 27.97 | 27.97 |
| PEP diol | 4.1 | | | | |
| BEPD diol | | 4.3 | | | |
| DESMODUR Z-4370 | 18.1 | 17.8 | 22.03 | 22.03 | 22.03 |
| DABCO T-12 | 0.06 | 0.06 | 0.05 | 0.05 | 0.05 |
| Isobutyl acetate | 40 | 40 | 50 | 50 | 50 |
| Cooked Resin Properties | | | | | |
| EB Diol B/Reinforcing diol | 90/10 | 90/10 | | | |
| NCO/OH | 0.6 | 0.6 | 3.0 | 3.0 | 3.0 |
| OH/NCO | | | 0.33 | 0.33 | 0.33 |
| Appearance | Clear | clear | clear | clear | clear |
| "A or B" Side Composition, pbw | | | | | |
| DESMODUR Z-4370 | 12.1 | 11.9 | | | |
| H₂O | | | ambient | | |
| PEP diol | | | | 5.9 | |
| BEPD diol | | | | | 6.4 |
| Dry A + B Coating Composition, % w | C-1 | C-2 | C-3 | C-4 | C-5 |
| EB diol | 60 | 60.1 | 64.5 | 60.4 | 60.0 |
| Reinforcing diol | 6.5 | 6.8 | | 6.3 | 6.9 |
| Triisocyanate | 33.5 | 33.1 | 35.5 | 33.3 | 33.1 |
| Catalyst | 0.1 | 0.1 | 0.1 | 0.1 | 0.1 |
| Properties[a] on Steel (QD412) | | | | | |
| Thickness, mil | 1.3 | 1.3 | 1.5 | 1.7 | 1.3 |
| Rocker Hardness, rocks | 8 | 6 | 6 | 8 | 8 |
| MEK Rubs | 21 | 84 | 21 | 41 | 20 |
| Crosshatch Adhesion | 0 | 0 | 0 | 0 | 0 |

TABLE 13-continued

Comparison of Hydroxyl Terminated and Isocyanate Terminated Resins

| Properties[a] on TPO (DEXFLEX 880) | | | | | |
|---|---|---|---|---|---|
| Rocker Hardness, rocks | 8 | 7 | 7 | 8 | 8 |
| MEK Rubs | 31 | 50 | 46 | 59 | 33 |
| Crosshatch Adhesion | 0 | 0 | 0 | 0 | 1 |
| General Appearance | | | | | |
| Tack | none | none | none | none | none |
| Gloss | high | high | high | high | high |
| Adhesion to Steel | poor | poor | poor | poor | poor |
| Adhesion to TPO | poor | poor | poor | poor | poor |
| Mar Resistance | fair | fair | fair | fair | fair |
| Film Characteristics | elastic | elastic | elastic | elastic | elastic |

[a]Properties after 1 week cure/dry at room temperature.

Coatings C-1 and C-2 used the hydroxyl terminated Resin Cooks A-1 and A-2 containing PEP and BEPD diols and using DESMODUR Z-4370 as the curing agent. Coatings C-4 and C-5 used the isocyanate terminated Resin Cook B-1 and used solutions of PEP and BEPD diols as the curing agents. Coating C-3 is the moisture cured coating from the isocyanate terminated resin, B-1. The results show very little difference among any of the five coatings.

EXAMPLE 10

It is also possible to use a hydroxyl terminated polyurethane resin cook as the A side and use an isocyanate terminated polyurethane resin cook as the B side of a 2-component, ambient temperature cure polyurethane. This is shown in Table 14.

TABLE 14

Cure of Hydroxyl Terminated Resin with Isocyanate Terminated Resin

| Resin Cook Composition, pbw | "A" Side Cook A-1 | "B" Side Cook B-1 | | | |
|---|---|---|---|---|---|
| EB DIOL B | 31.8 | 27.97 | | | |
| BEPD diol | 6.2 | | | | |
| DESMODUR Z-4370 | 22 | 22.03 | | | |
| DABCO T-12 | 0.06 | 0.05 | | | |
| Isobutyl acetate | 40 | 50 | | | |
| Cooked Resin Properties | | | | | |
| EB Diol B/Reinforcing diol | 84/16 | | | | |
| NCO/OH | 0.6 | 3.0 | | | |
| OH/NCO | | 0.33 | | | |
| Appearance | clear | clear | | | |

| Coating Composition, pbw | C-1 | C-2 | C-3 | C-4 | C-5 | C-6 |
|---|---|---|---|---|---|---|
| "A" Side Resin Cook | 2491 | 2491 | | | | 2491 |
| "B" Side Resin Cook | | | 2485 | 2485 | 2485 | 2485 |
| DESMODUR Z-4370 | | 401.5 | | | | |
| n-Butanol | | | | 200 | | |
| H$_2$O | | | | | ambient | |
| BEPD diol | | | | | 80 | |
| Dry A + B Coating Composition, % w | C-1 | C-2 | C-3 | C-4 | C-5 | C-6 |
| EB diol | 60.5 | 50.0 | 64.5 | 64.5 | 60 | 61.7 |
| Reinforcing diol | 11.8 | 9.7 | | | 6.9 | 6.4 |
| Triisocyanate | 27.8 | 40.3 | 35.5 | 35.5 | 33.1 | 31.8 |
| Catalyst | 0.1 | 0.1 | 0.1 | 0.1 | 0.1 | 0.1 |
| Properties[a] on Steel (QD412) | | | | | | |
| Thickness, mil | | | 1.0 | | | 1.4 |
| Rocker Hardness, rocks | 4 | 3 | 6 | 8 | 7 | |
| MEK Rubs | 39 | <20 | 41 | 18 | 46 | |
| Crosshatch Adhesion | 0 | 0 | 0 | 0 | 0 | |
| Properties[a] on TPO (DEXFLEX 880) | | | | | | |
| Rocker Hardness, rocks | 4 | 5 | 7 | 8 | 7 | |

TABLE 14-continued

| Cure of Hydroxyl Terminated Resin with Isocyanate Terminated Resin | | | | | | |
|---|---|---|---|---|---|---|
| MEK Rubs | 80 | 40 | 40 | 21 | >100 | |
| Crosshatch Adhesion | 0 | 0 | 0–2 | 1–4 | 2 | |
| General Appearance | | | | | | |
| Tack | none | none | none | none | none | none |
| Gloss | high | high | high | high | high | high |
| Clarity | clear | clear | Clear | clear | clear | clear |
| Adhesion to Steel | poor | poor | poor | poor | poor | poor |
| Adhesion to 'TPO | v poor | v poor | poor | fair[b] | fair[b] | fair |
| Mar Resistance | poor | poor | poor | fair | fair | poor |
| Film Characteristics | elastic, tough | elastic, tough | high set | elastic | elastic | elastic |

[a]Properties after 1 week cure/dry at room temperature.
[b]Adhesion varied from very good in spots to fair-poor in spots. No pattern was apparent.

The A Side Resin Cook A-1 used EB diol and BEPD diol with triisocyanate at 0.6 NCO/OH. The B Side Resin Cook B-1 was the EB diol capped with 2 moles of triisocyanate. Various coatings were prepared to allow insight into the significance of the components. Coating C-1 is merely the OH terminated A Side Resin Cook A-1 cast and dried as is without crosslinker. Coating C-2 is the A Side Resin Cook A-1 cured with DESMODUR Z-4370 in a two component polyurethane at 1.1 NCO/OH. Coating C-3 is the NCO terminated B Side Resin Cook B-1 at 3.0 NCO/OH after it has been terminated by reaction with n-butanol. Coating C-4 is a one component, moisture cured polyurethane. Coating C-5 is a two component polyurethane using the B Side Resin Cook B-1 cured with BEPD diol (as a 50% w solution in solvent) at 1.0 NCO/OH. Coating C-6 is a two component polyurethane using the A Side Resin Cook A-1 and the B Side Resin Cook B-1 at 1.0 NCO/OH.

The properties are shown in Table 14. Although no quantitative properties were measured on Coating C-1, qualitative evaluation shows that the uncrosslinked film has surprising integrity. In fact, comparison of the Gel Permeation Chromatograms on EB DIOL B and on Coating C-1 shows that a substantial amount of high molecular weight polymer formed, even though the NCO/OH was only 0.6. Comparison of the qualitative properties of Coatings C-1 and C-2 shows that properties do not change substantially by crosslinking the film. Coating C-3 is the EB diol capped with 2 moles of triisocyanate and terminated with n-butanol. No high molecular weight polymer is expected in this sample and indeed, the film has poor integrity showing high permanent set when stretched. Crosslinking this B Side Resin Cook with moisture (Coating C-4), with BEPD diol (C-5) or with the A Side Resin Cook (C-6) converts it into an elastic film with higher hardness and generally better MEK resistance.

EXAMPLE 11

Effect of Isocyanate Type—Multifunctional isocyanates based on HDI are lower in viscosity and higher in reactivity than DESMODUR Z-4370. Table 15 shows attempts to make isocyanate terminated resins with the EB diol using two HDI based isocyanates, DESMODUR N-3390 and N-3400. These isocyanates are believed to have functionality of 3.0 and 2.5, respectively.

TABLE 15

| Resin Cooks Using HDI-Based Isocyanates for Moisture Cure | | | | | |
|---|---|---|---|---|---|
| "B" Side Resin Cook Composition, pbw | Cook B-1 | Cook B-2 | Cook B-3 | Cook B-4 | Cook B-5 |
| EB DIOL B | 34.1 | 32.39 | 37.12 | 39.13 | 39.69 |
| DESMODUR N-3390 | 15.9 | 17.61 | | | |
| DESMODUR N-3400 | | | 12.88 | 10.87 | 10.31 |
| DABCO T-12 | 0.05 | 0.05 | 0.05 | 0.05 | 0.05 |
| Isobutyl acetate | 50 | 50 | 50 | 50 | 50 |
| Cooked Resin Properties | | | | | |
| NCO/OH | 3.0 | 3.5 | 2.5 | 2 | 1.9 |
| OH/NCO | 0.33 | 0.29 | 0.40 | 0.50 | 0.53 |
| Appearance | gelled | clear | hazy | sl hazy | clear |
| "A" Side Composition, pbw | | | | | |
| Water | | ambient | ambient | ambient | ambient |
| Dry A + B Coating Composition, % w | C-1 | C-2 | C-3 | C-4 | C-5 |
| EB diol | 70.4 | 67.1 | 74.2 | 78.2 | 79.3 |
| Triisocyanate | 29.5 | 32.8 | 25.7 | 21.7 | 20.6 |
| Catalyst | 0.1 | 0.1 | 0.1 | 0.1 | 0.1 |
| Properties[a] on Steel (QD412) | | | | | |
| Thickness, mil | | | | 0.9 | 1.2 |

TABLE 15-continued

Resin Cooks Using HDI-Based Isocyanates for Moisture Cure

| | | |
|---|---|---|
| MEK Rubs | 80 | 29 |
| Crosshatch Adhesion | 0 | 0 |
| Properties[a] on TPO | | |
| (DEXFLEX 880) | | |
| MEK Rubs | 69 | 50 |
| Crosshatch Adhesion | 0 | 0 |
| General Appearance | | |
| Gloss | fair | high |
| Clarity | clear | clear |
| Adhesion to Steel | poor | poor |
| Adhesion to TPO | poor | poor |
| Mar Resistance | good | good |
| Film Characteristics | elastic | elastic |
| Color | none | none |

[a]Properties after 1 week cure/dry at room temperature.

The result on Resin Cook B-1 showed that with DESMODUR N-3390, incorporating the EB diol at 0.33 OH/NCO was too close to stoichiometric, causing the resin to gel. However, Cook B-2 at 0.29 OH/NCO, was a nice, clear resin. The results with Resin Cooks B-3, B-4 and B-5 show that the EB diol can be incorporated into DESMODUR N-3400 at higher concentrations than DESMODUR N-3390 because of the lower functionality of DESMODUR N-3400. In order to achieve a nice, clear resin, the EB diol had to be incorporated at 0.53 OH/NCO. Coatings C-4 and C-5, containing about 79% w EB diol in the cured coating, moisture cure to give clear, glossy, elastic films.

EXAMPLE 12

Aromatic isocyanates are much lower cost than aliphatic isocyanates and are suitable for use in applications where their brown color is not a problem and which do not require good exterior weatherability. Results in Table 16 on Resin Cooks B-1 and B-2 show that clear, phase stable, isocyanate terminated resins can be made incorporating either an EB diol or an S/EB diol into MONDUR MR at 0.33 OH/NCO. These resins can be moisture cured (Coatings C-1 and C-3) or can be used as the B side of a two component polyurethane with a solution of BEPD diol as the A side (Coatings C-2 and C-4). All four of these compositions based on MONDUR MR give clear, glossy, elastic films which have a distinctly brown color.

TABLE 16

Resin Cooks using
MDI-Based Isocyanate for Cure with Moisture or BEPD Diol

| "B" Side Resin Cook Composition, pbw | Cook B-1 | Cook B-1 | Cook B-2 | Cook B-2 |
|---|---|---|---|---|
| EB DIOL B | 46.5 | 46.5 | | |
| EB DIOL C | | | 49.4 | 49.4 |
| MONDUR MR | 13.5 | 13.5 | 10.6 | 10.6 |
| DABCO T-12 | 0.03 | 0.03 | 0.03 | 0.03 |
| Isobutyl acetate | 40 | 40 | 40 | 40 |
| Cooked Resin Properties | | | | |
| NCO/OH | 3 | 3 | 3 | 3 |
| OH/NCO | 0.33 | 0.33 | 0.33 | 0.33 |
| Appearance | clear | clear | clear | clear |
| "A" Side Composition, pbw | | | | |
| Water | ambient | | ambient | |

TABLE 16-continued

Resin Cooks using
MDI-Based Isocyanate for Cure with Moisture or BEPD Diol

| | | | | |
|---|---|---|---|---|
| BEPD | | 5.4 | | 4.2 |
| Dry A + B Coating Composition, % w | C-1 | C-2 | C-3 | C-4 |
| EB diol | 77.5 | 71.1 | 82.4 | 77.0 |
| Triisocyanate | 22.5 | 20.6 | 17.6 | 16.5 |
| BEPD diol | | 8.2 | | 7.5 |
| Catalyst | 0.050 | 0.046 | 0.050 | 0.047 |
| Properties[a] on Steel (QD412) | | | | |
| Thickness, mil | 1.2 | 1.2 | 1.2 | 1.2 |
| Rocker Hardness, rocks | 6 | 4 | 2 | 2 |
| MEK Rubs | >100 | 13 | 53 | 14 |
| Crosshatch Adhesion | 0 | 0 | 0 | 0 |
| Properties[a] on TPO (DEXFLEX 880) | | | | |
| Rocker Hardness, rocks | 6 | 5 | | |
| MEK Rubs | >100 | 42 | | |
| Crosshatch Adhesion | 1 | 1 | 0 | 0 |
| General Appearance | | | | |
| Gloss | high | high | high | high |
| Clarity | clear | clear | clear | clear |
| Adhesion to Steel | v poor | v poor | poor | poor |
| Adhesion to TPO | poor | poor | poor | poor |
| Mar Resistance | good | good | v good | good |
| Film Characteristics | elastic | elastic | elastic | elastic |
| Color | brown | brown | brown | brown |

[a]Properties after 1 week cure/dry at room temperature.

EXAMPLE 13

Properties of Bake Cured Coatings—One of the primary advantages of a two component coating is that it will cure at ambient temperatures, as is required in maintenance coatings for wood, concrete, etc. However, there are many applications where the coating will be cured at elevated temperature to accelerate the reaction and reduce the time required for cure to take place. A major example of this is in automotive coatings where the painted part is baked, typically for 30 minutes at 121° C., to dry and cure the paint. Table 17 compares the properties of 2-component coatings when cured at room temperature and when cured by baking 30 minutes at 121° C. on a TPO substrate which is used for automotive bumpers.

TABLE 17

Effect of Cure Temperature on Adhesion to TPO

| "A" Side Resin Cook Composition, pbw | Blend A-1 | Cook A-2 | Cook A-3 | Cook A-4 |
|---|---|---|---|---|
| EB DIOL B | 60 | 24.0 | 25.7 | 24.0 |
| PEP diol | | 7.0 | | |
| BEPD diol | | | 8.1 | |
| HBPA diol | | | | 10.1 |
| DESMODUR Z-4370 | | 29.0 | 26.2 | 25.9 |
| DABCO T-12 | | 0.06 | 0.06 | 0.06 |
| Isobutyl acetate | 40 | 40 | 40 | 40 |
| Cooked Resin Properties | | | | |
| EB Diol B/Reinforcing diol | 100/0 | 77/23 | 76/24 | 73/30 |
| NCO/OH | | 0.7 | 0.6 | 0.7 |
| Appearance | | clear | clear | clear |

| Wet Coating Composition, % w | C-1 | C-2 | C-3 | C-4 | C-5 | C-6 | C-7 |
|---|---|---|---|---|---|---|---|
| "A" Side Composition, pbw | | | | | | | |
| Blend A-1 | 84.72 | 56.65 | 36.86 | 57.31 | 37.72 | 51.69 | 32.29 |
| Resin Cook A-2 | | 28.99 | 49.39 | | | | |
| Resin Cook A-3 | | | | 26.98 | 46.23 | | |
| Resin Cook A-4 | | | | | | 26.51 | 43.33 |
| Isobutyl acetate | | | | | | 9.04 | 12.98 |
| "B" Side Composition, pbw | | | | | | | |
| DESMODUR Z-4370 | 17.3 | 13.8 | 13.1 | 15.1 | 15.5 | 12.2 | 10.9 |
| Dry A + B Coating Composition, % w | C-1 | C-2 | C-3 | C-4 | C-5 | C-6 | C-7 |
| EB diol | 83.2 | 70.0 | 60.0 | 70.0 | 60.0 | 70.0 | 60.0 |
| Reinforcing diol | | 3.5 | 6.1 | 3.7 | 6.5 | 5.0 | 8.8 |
| Triisocyanate | 16.8 | 26.5 | 33.9 | 26.3 | 33.5 | 25.0 | 31.2 |
| Catalyst | 0.06 | 0.06 | 0.06 | 0.06 | 0.06 | 0.06 | 0.06 |
| Properties[a] on TPO After 1 Week Cure at 25° C. | | | | | | | |
| Rocker Hardness, rocks | 2 | 3 | 6 | 3 | 6 | 3 | 6 |
| Pencil Hardness | 3B | <4B | <4B | 4B | <4B | 4B | <4B |
| MEK Rubs | >100 | 57 | 37 | 78 | 75 | 70 | 30 |
| Crosshatch Adhesion | 2 | 5 | 1 | 0 | 2 | 2 | 2 |
| Qualitative Adhesion | poor | v poor | poor | poor | poor | poor | v poor |
| Properties[a] on TPO After 30 minutes at 121° C. | | | | | | | |
| Rocker Hardness, rocks | 2 | 2 | 6 | 4 | 6 | 3 | 5 |
| Pencil Hardness | B | <4B | <4B | B | <4B | 2B | <4B |
| MEK Rubs | >100 | 65 | 65 | >100 | >100 | >100 | 100 |
| Crosshatch Adhesion | 5 | 5 | 5 | 5 | 5 | 5 | 5 |
| Qualitative Adhesion | good | v good | v good | poor | good | v good | poor |
| General Appearance | | | | | | | |
| Gloss | exc | good | good | fair | fair | good | good |
| Clarity | clear | clear | clear | clear | clear | clear | clear |
| Adhesion to Steel | v poor | v poor | v poor | v poor | v poor | v poor | v poor |
| Mar Resistance | poor | fair | good | fair | fair | good | good |
| Surface | exc | fair | good | poor | poor | good | fair |

[a]Properties of coatings at about 1.5 mil dry thickness on DEXFLEX 880 TPO.

In these experiments, Blend A-1 of EB diol in solvent was prepared and the three Resin Cooks A-2, A-3 and A-4 were prepared using PEP, BEPD and HBPA as the reinforcing diols. The diol solution A-1 was blended with each of the three resin cooks in appropriate proportions such that when cured with DESMODUR Z-4370 as the "B" side, the coatings contained 70% w (C-2, C-4 and C-6) and 60% w (C-3, C-5 and C-7) EB diol in the final cured coatings. One set of the coatings on TPO was cured for 1 week at room temperature and another set was baked 30 minutes at 121° C. It was found that the general appearance of the coatings cured at room temperature was the same as those cured by baking. In fact, the only property which showed strong dependence on cure condition was adhesion to the TPO. The coatings cured at room temperature could be easily peeled off the TPO while those which were baked showed much better adhesion to the TPO.

Coating C-1 in Table 17 gave a very nice coating which adhered well to TPO when baked. However, since it contains no reinforcing diol, it could easily be cut through with a fingernail and it is probably too soft for use in practical applications. Coatings C-2 and C-3 containing PEP diol were both very nice coatings. Qualitatively, the adhesion of Coating C-3 to TPO after cure by baking was excellent and its resistance to being marred was good. Coatings C-4 and C-5 containing BEPD diol were good coatings although their surfaces displayed some alligatoring (crazing). Their adhesion to TPO after cure by baking was good but they still could be manually rubbed off of the TPO with difficulty. Coating C-6 containing HBPA was quite similar to C-2, both in its appearance and its adhesion. Coating C-7 was a nice coating which after bake cure, showed no adhesion loss in the crosshatch adhesion test. However, it could be peeled from the TPO fairly easily. It peeled by a stick/slip type mechanism so it left a chatter pattern on the TPO as it was peeled off. Coating C-3 in Table 17 is felt to be the best candidate for use as a coating for TPO for automotive bumpers.

EXAMPLE 14

Cure with Blocked Isocyanate—Two component coatings must be mixed immediately before use and then they must be applied to the substrate before the reaction progresses to the extent that they become too thick to handle. For coatings which will be cured by baking, one can use a blocked isocyanate as the curing agent in a one component coating and not have to worry about the pot life of the coating. In a blocked isocyanate, the NCO groups of the "B" side type crosslinker have been reacted with a blocking agent such as phenol, butanone oxime or caprolactam. A stoichiometric amount of the blocked isocyanate is mixed with the polyol "A" side but no reaction occurs at room temperature. After the coating is applied to the substrate and heated in the baking oven, the blocking agent deblocks and volatilizes out of the film, regenerating the NCO groups which then react with the polyol. The temperature at which deblocking occurs depends on the particular blocking agent.

Two blocked isocyanates which are commercially available are DESMODUR BL-3175A and BL-4165, based on HDI and IPDI, respectively. Both are believed to be blocked with butanone oxime. The recommended bake temperature is 150° C. Table 18 shows formulations for curing a hydroxy functional "A" Side Resin Cook, A-1, with a stoichiometric amount of these two curing agents. With DESMODUR BL-4165, the stoichiometry was also varied. Results show that DESMODUR BL-3175A, based on HDI, gave a cloudy blend with the polyol resin cook indicating limited compatibility. Nonetheless, the good result in the MEK rub test on Coating C-1 shows that it is still an effective crosslinker for the polyol. As expected, blends of the polyol Resin Cook A-1 with DESMODUR BL-4165 were clear, indicating good compatibility. Again the good results in the MEK rub test on Coatings C-2, C-3 and C-4 show that this isocyanate is a good crosslinker for the polyol.

TABLE 18

Cure of EB DIOL/PEP/4370 Resin Cook with Blocked Isocyanate

| Resin Cook Composition, pbw | Cook A-1 |
|---|---|
| EB DIOL B | 32.1 |
| PEP diol | 5.7 |
| DESMODUR Z-4370 | 22.2 |
| DABCO T-12 | 0.06 |
| Isobutyl acetate | 40 |
| Cooked Resin Properties | |
| EB Diol B/PEP diol | 85/15 |

TABLE 18-continued

Cure of EB DIOL/PEP/4370 Resin Cook with Blocked Isocyanate

| | | | | |
|---|---|---|---|---|
| NCO/OH | 0.6 | | | |
| Appearance | clear | | | |

| Wet Coating Composition, pbw | C-1 | C-2 | C-3 | C-4 |
|---|---|---|---|---|
| Resin Cook | 2468 | 2468 | 2468 | 2468 |
| DESMODUR BL-3175A | 370 | | | |
| DESMODUR BL-4165 | | 519.0 | 467.0 | 571.0 |
| DABCO T-12 | 0.9 | 0.9 | 0.9 | 0.9 |
| Appearance of Blend | cloudy | clear | clear | clear |
| Dry Coating Composition, % w | | | | |
| EB diol | 49.7 | 47.9 | 48.9 | 46.9 |
| PEP diol | 8.8 | 8.5 | 8.7 | 8.3 |
| IPDI triisocyanate | 24.1 | 43.6 | 42.4 | 44.7 |
| HDI triisocyanate | 17.4 | | | |
| Catalyst | 0.09 | 0.09 | 0.09 | 0.09 |
| Properties[a] on Steel (QD412) After 1 hour at 150° C. | | | | |
| Thickness, mil | 1.4 | 1.5 | 1.4 | 1.6 |
| Rocker Hardness, rocks | 3 | 9 | 8 | 10 |
| MEK Rubs | >100 | >100 | >100 | >100 |
| Mar Resistance | poor | poor | poor | poor |

The recommended bake temperature of 150° C. is probably too high to cure coatings on TPO because the TPO may distort at 150° C. Therefore, the coatings in Table 18 were only applied to steel panels and adhesion of the cured coatings was poor.

EXAMPLE 15

Resin Cooks with Blocked Isocyanates—In the work described above, resins were synthesized in cooks using stoichiometry far enough away from 1.0 NCO/OH that the resins had handleable viscosities at reasonable solids contents. For example, hydroxy functional polyurethane resins were made at 0.6 NCO/OH. These resins were then used as the "A" side of a two component coating, the "B" side being the rest of the isocyanate necessary to bring the stoichiometry to 1.0 NCO/OH. If the coating is intended for applications in which it will be cured by baking, then the resin cook can be done using a blocked isocyanate. The EB diol, reinforcing diol and blocked isocyanate could be charged to the resin kettle at 1.0 NCO/OH and cooking time and temperature could be adjusted to give sufficient reaction to give a phase stable, one component resin. This resin could then be coated and cured by baking without having to add any more reactants. Formulations to test the feasibility of this approach are presented in Table 19.

TABLE 19

Resin Cooks Made With Blocked Isocyanates

| Resin Cook Composition, pbw | Cook AB-1 | Cook AB-2 | Cook AB-3 | Cook AB-4 | Cook AB-5 |
|---|---|---|---|---|---|
| EB DIOL B | 24.4 | 24.4 | 24.4 | 26.4 | 26.4 |
| BEPD diol | 3.5 | 3.5 | 3.5 | 4.7 | 4.7 |
| DESMODUR BL-4165 | 32.1 | 32.1 | 32.1 | | |
| DESMODUR BL-3175A | | | | 28.9 | 28.9 |
| DABCO T-12 | 0.06 | 0.06 | 0.06 | 0.06 | 0.06 |
| Isobutyl acetate | 40 | 40 | 40 | 40 | 40 |
| Cook Time, hr | 6 | 6 | 1.5 | 8 | 4 |
| Cook Temp, °C. | 100 | 120 | 120 | 100 | 140 |
| Cooked Resin Properties | | | | | |
| EB Diol B/BEPD diol | 87/13 | 87/14 | 87/15 | 85/15 | 85/16 |
| NCO/OH | 1.0 | 1.0 | 1.0 | 1.0 | 1.0 |
| Phase Stability | separated | stable | stable | separated | separated |
| Clarity | | clear | clear | | |
| Color | orange | burgundy | yellow | dark red | dark red |

| Dry Coating Composition, % w | C-1 | C-2 | C-3 | C-4 | C-5 |
|---|---|---|---|---|---|
| EB diol | 50.0 | 50.0 | 50.0 | 50.0 | 50.0 |
| BEPD diol | 7.3 | 7.3 | 7.3 | 9.0 | 9.0 |
| Triisocyanate | 42.8 | 42.8 | 42.8 | 41.0 | 41.0 |
| Catalyst | 0.10 | 0.10 | 0.10 | 0.10 | 0.10 |
| Properties on Steel (QD412) Cured 1 hr at 150° C. | | | | | |
| Thickness, mil | | 1.5 | 1.5 | | |
| Gloss | | fair | fair | | |
| Mar Resistance | | v poor | v poor | | |

Resin Cook AB-1 used EB diol, BEPD diol and the blocked triisocyanate based on IPDI, DESMODUR BL-4165. Since the proper combination of cook time and temperature was not known, the resin was arbitrarily cooked 6 hours at 100° C. However, these conditions did not give sufficient reaction since the resin separated when cooled to room temperature. Therefore, in the next run, the resin was cooked 6 hours at 120° C. As shown in Table 19, these conditions did give a stable resin (AB-2). However, the blocking agent caused the resin to turn a deep burgundy color. So the resin cook was repeated except cooking only 1.5 hours at 120° C. These conditions were sufficient to give a phase stable resin which was only yellow in color (AB-3). When coated on steel and baked 1 hour at 150° C., the composition Coating C-3 cured well to give a nontacky coating having fair gloss.

Two attempts were made to prepare resins using EB diol, BEPD diol and DESMODUR BL-3175A, the blocked triisocyanate based on HDI. It was anticipated that this cook would be more difficult than with DESMODUR BL-4165 because of the limited compatibility with DESMODUR BL-3175A observed in the curing experiments described in the previous section. In the first cook with DESMODUR BL-3175A, the resin was cooked 8 hours at 100° C. As shown in Table 19, this Resin Cook AB-4 separated when cooled to room temperature. Another run was made except cooking for 4 hours at 140° C. Again the resin (Cook AB-5) separated when cooled. Since a phase stable resin was not obtained even under these very severe cooking conditions, no further work was done with DESMODUR BL-3175A.

EXAMPLE 16

Mar Resistance—Throughout this work, it was observed that these polyurethane coatings frequently had poor resistance to marring when scratched with a fingernail. Good mar resistance would certainly be needed in a topcoat but may not be necessary in the basecoat of a basecoat/clearcoat system since the clearcoat would protect the basecoat against being marred. Nonetheless, it would be important to understand the reason for the poor mar resistance. To study the influence of composition on mar resistance, the formulations in Table 20 were prepared.

TABLE 20

Relationship of Mar Resistance and Gel Content

| "A" Side Resin Cook Composition, pbw | Blend A-1 | Cook A-2 | Cook A-3 |
|---|---|---|---|
| EB DIOL B | 60 | 37.8 | 25.74 |
| BEPD diol | | 4.3 | 8.08 |
| DESMODUR Z4370 | | 17.8 | 26.18 |
| DABCO T-12 | | 0.06 | 0.06 |
| Isobutyl acetate | 40 | 40 | 40 |
| Cooked Resin Properties | | | |
| EB Diol B/BEPD diol | | 90/10 | 76/24 |
| NCO/OH | | 0.6 | 0.6 |
| Appearance | | clear | clear |

| Wet Coating "A" Side Composition, pbw | C-1 | C-2 | C-3 | C-4 | C-5 |
|---|---|---|---|---|---|
| Blend A-1 | 2317 | 1605 | 626 | | |
| Resin Cook A-2 | | 942 | 2240 | 2209 | 675 |
| Resin Cook A-3 | | | | 585 | 1631 |
| DABCO T-12 | 0.8 | 0.9 | 1.0 | 0.98 | 0.83 |
| Isobutyl acetate | 624.0 | 670.0 | 734.0 | 719 | 622 |

TABLE 20-continued

Relationship of Mar Resistance and Gel Content

"B" Side Composition, pbw

| | | | | | |
|---|---|---|---|---|---|
| DESMODUR Z-4370 | 401.5 | 401.5 | 401.5 | 401.5 | 401.5 |

Dry A + B Coating Composition, % w

| | | | | | |
|---|---|---|---|---|---|
| EB diol | 83.2 | 75.0 | 65.0 | 55.0 | 45.0 |
| BEPD diol | | 2.3 | 5.2 | 8.0 | 10.7 |
| Triisocyanate | 16.8 | 22.7 | 29.8 | 37.0 | 44.3 |
| Catalyst | 0.1 | 0.1 | 0.1 | 0.1 | 0.1 |

Properties[a] on 2 mil MYLAR

| | | | | | |
|---|---|---|---|---|---|
| Gel Content, % w | 99.2 | 96.4 | 92.6 | 84.1 | 80.1 |
| Mar Resistance | poor[b] | fair | fair | poor[c] | poor[c] |

[1]Properties of coatings at 1.2 mil dry thickness after 10 days cure at ambient temperature.
[b]Coating is weak and can easily be cut through with a fingernail.
[c]Coating has a weak surface layer which can be easily marred.

Blend A-1 of EB diol in solvent was prepared and the two hydroxy functional resins, Cooks A-2 and A-3, shown in Table 20 were cooked. These were then blended together in the proper proportions to give "A" side polyols such that when cured with DESMODUR Z-4370 at 1.1 NCO/OH, they gave final cured coatings containing 83, 75, 65, 55 and 45% w EB diol. The coatings (C-1 through C-5) were applied on polyester film and cured 10 days at room temperature. Their mar resistance was then assessed qualitatively by scratching with a fingernail.

Results in Table 20 show that the mar resistance of Coating C-1, containing no reinforcing diol, is poor. The reason for this is that this coating is so soft that a fingernail can cut through the coating fairly easily. Results on Coatings C-2 and C-3 show that, as expected, including reinforcing diol in the formulation makes the coating harder and tougher and so the mar resistance improves. However, results on Coatings C-4 and C-5 show that including even more reinforcing diol makes the mar resistance poorer. It is readily apparent when scratching coatings of Coatings C-4 and C-5 that there is a thin layer of something on the surface of these coatings which is easily marred.

These cured coatings were extracted twice with toluene for 10 minutes at 125° C. to determine their gel/sol contents. Results in Table 20 show that, to get good mar resistance, the formulation should contain sufficient reinforcing diol to make the coating tough enough to resist cut through but not so much that the gel content drops below about 90% w.

EXAMPLE 17

Adhesion to EPDM—A roll of 1.5 mm (55 mil) thick EPDM sheet was used in this experiment. This material is sold for use as a roofing membrane. The weakest point in the water barrier provided by EPDM sheet is the overlap seam where the sheets are glued together in place on the roof Since the EPDM sheet is vulcanized and nonpolar, it is very difficult to adhere to. To determine whether a two component polyurethane based on the EB diol could be used as a lap seam adhesive, the formulations in Table 21 were tested.

TABLE 21

Resin Cooks as Adhesives for EPDM Sheet

| "A or B" Side Resin Cook Composition, pbw | Blend A-1 | Blend A-2 | Cook A-3 | Cook A-4 | Cook B-5 |
|---|---|---|---|---|---|
| EB DIOL B | | | 37.8 | 37.8 | 27.97 |
| PEP diol | 50 | | 4.1 | | |
| BEPD diol | | 50 | | 4.3 | |
| DESMODUR Z-4370 | | | 18.1 | 17.8 | 22.03 |
| DABCO T-12 | | | 0.06 | 0.06 | 0.05 |
| Isobutyl acetate | 50 | 50 | 40 | 40 | 50 |

Cooked Resin Properties

| | | | | | |
|---|---|---|---|---|---|
| EB Diol B/Reinforcing diol | | | 90/10 | 90/10 | |
| NCO/OH | | | 0.6 | 0.6 | 3.0 |
| OH/NCO | | | | | 0.33 |
| Appearance | | | clear | clear | clear |

Wet Adhesive "A" Side Composition, pbw | C-1 | C-2 | C-3 | C-4 | C-5

| | | | | | |
|---|---|---|---|---|---|
| Moisture | ambient | | | | |
| PEP Blend A-1 | | 146 | | | |
| BEPD Blend A-2 | | | 160 | | |
| Resin Cook A-3 | | | | 3019 | |
| Resin Cook A-4 | | | | | 3068 |
| DABCO T-12 | 1.2 | 1.3 | 1.3 | 2.1 | 2.1 |

"B" Side Composition, pbw

| | | | | | |
|---|---|---|---|---|---|
| Resin Cook B-5 | 2485 | 2485 | 2485 | | |
| DESMODUR Z-4370 | | | | 365 | 365 |

Dry A + B Adhesive Composition, % w | C-1 | C-2 | C-3 | C-4 | C-5

| | | | | | |
|---|---|---|---|---|---|
| EB diol | 64.5 | 60.4 | 60.0 | 60.0 | 60.1 |
| PEP diol | | 6.3 | | 6.5 | |
| BEPD diol | | | 6.9 | | 6.8 |
| Triisocyanate | 35.5 | 33.1 | 33.1 | 33.5 | 33.1 |
| Catalyst | 0.1 | 0.1 | 0.1 | 0.1 | 0.1 |

Properties[a] on EPDM Sheet

| | | | | | |
|---|---|---|---|---|---|
| "T" Peel after 1 week | 8.4 | 13.5 | 7 | 7.6 | 7.2 |
| "T" Peel after 3 weeks | 13 | 18[b] | 12 | 7 | 8.5 |

[a]Adhesive was brushed onto the EPDM at approximately 3 mil dry thickness.
[b]All samples failed adhesively at the EPDM/adhesive interface except this one which failed by partial cohesive failure of the EPDM rubber itself.

Adhesive C-1 in Table 21 (moisture cure of NCO functional Resin Cook B-5) has 65% w EB diol in the final cured adhesive. The other four have 60% w EB diol in the final cured adhesive. Adhesives C-2 and C-4 have the same composition and Adhesives C-3 and C-5 have the same composition. They differ in that Adhesives C-2 and C-3 use the approach of a "B" Side Resin Cook cured with a solution of reinforcing diol while Adhesives C-4 and C-5 use the approach of an "A" Side Resin Cook cured with DESMODUR Z-4370.

The EPDM sheet was cut into 1 inch wide strips and the surface talc was washed off. Adhesive was brushed onto one side of two strips and, after about a 15 minute flash off of solvent, the strips were mated, adhesive to adhesive. The strips were placed between two glass plates to dry and cure. Adhesion was determined by measuring "T" peels on an Instron machine at a crosshead speed of 12 inch per minute at 23° C.

The results in Table 21 show that after 1 week cure at room temperature, "T" peels were about 7 pounds per inch of width (pli). It was noted during the peel measurement, however, that the samples still had the odor of solvent. Therefore, the samples were allowed to dry for another 2 weeks and the "T" peels were measured again. As shown in Table 21, all five of the adhesives met or exceeded 7 pli which is considered the minimum acceptable value. The best results were obtained with the isocyanate functional "B" Side Resin Cook (B-5). In fact, Adhesive C-2 showed cohesive failure of the EPDM sheet itself in the peel test. The butyl rubber based contact adhesive which is now used commercially gave 11.8 pli T peel. Other potential applications are coatings which can be pigmented to a desired color to hide the black color of EPDM for roofing or automotive applications or coatings which can reduce the coefficient of friction for automotive gaskets, for example.

EXAMPLE 18

Silane Capped Polyurethane—It was shown above that a "B" Side Resin Cook such as the EB diol capped with 2 moles of DESMODUR Z-4370 can be cured by reaction with atmospheric moisture. The other well known moisture cure chemistry is via condensation of silyl ethers to form Si—O—Si linkages. One way to cap a diol with a silane is by reaction with a isocyanatosilane such as isocyanatopropyltriethoxysilane (SILQUEST A1310 from OSI). This would give a diol converted to have one silane on each end. Another way to cap a diol with a silane is by capping first with 2 moles of difunctional or trifunctional isocyanate and then capping again with 2 or 4 moles of a mercaptosilane (SILQUEST A-189). This would give a diol converted to have one or two silanes on each end. Another way is to cap with 2 moles of triisocyanate and then cap with an aminosilane such as a secondary aminodisilane (SILQUEST A-1170). This would put four silanes on each end of the polymer. Silane capped polyurethanes like these will be especially useful for application in moisture cure sealants as well as in adhesives and coatings.

TABLE 22

Silane Capped Polyurethane Cook for Moisture Cured Coatings

| Resin Cook Composition, pbw | Cook B-1 | Cook B-2 |
|---|---|---|
| EB DIOL B | 28.0 | 24.2 |
| DESMODUR Z-4370 | 22.0 | 19.0 |
| SILQUEST A-189 | | 6.8 |
| DABCO T-12 | 0.05 | 0.05 |
| Isobutyl acetate | 50 | 50 |
| Resin Cook Composition, equiv | | |
| EB DIOL B | 1.0 | 1.0 |
| DESMODUR Z-4370 | 3 | 3 |
| SILQUEST A-189 | | 2 |
| Resin Cook Composition, mole | | |
| EB DIOL B | 1 | 1 |
| DESMODUR Z-4370 | 2 | 2 |
| SILQUEST A-189 | | 4 |
| Dry Coating Composition, % w | C-1 | C-2 |
| EB diol | 64.5 | 54.5 |
| Triisocyanate | 35.5 | 30.1 |
| Mercapto silane | | 14.1 |
| Catalyst | 0.10 | 0.10 |
| Properties[a] on Steel (QD412) | | |
| Thickness, mil | 1.1 | 1.0 |
| Rocker Hardness, rocks | 7 | 5 |
| MEK Rubs | 86 | 70 |

TABLE 22-continued

Silane Capped Polyurethane Cook for Moisture Cured Coatings

| | | |
|---|---|---|
| Crosshatch Adhesion Properties[a] on TPO (DEXFLEX 880) | 0 | 0 |
| Rocker Hardness, rocks | 7 | 6 |
| MEK Rubs | >100 | >100 |
| Crosshatch Adhesion | 3 | 3 |
| General Appearance | | |
| Gloss | high | high |
| Mar Resistance | poor | v good |
| Adhesion to TPO | good | fair |

[a]Properties after 1 week cure at ambient temperature by atmospheric moisture

The results in Table 22 compare moisture cure of an NCO capped polyurethane, Resin Cook B-1, and a silane capped polyurethane, Resin Cook B-2. The NCO capped polyurethane was made by reaction of 1 mole of EB diol with 2 moles of DESMODUR Z-4370. Thus, the average molecule in this composition is the EB diol with one mole of triisocyanate on each end, leaving 2 NCO groups on each end. The silane capped resin in Table 22 was made by capping this NCO capped polymer with 4 moles of gamma-mercaptopropyl trimethoxysilane. This makes a molecule having on average two $Si(OCH3)_3$ groups on each end of the polymer.

The actual procedure to make Resin Cook B-2 in Table 22 was the following: 66.63 grams of DESMODUR Z-4370, 126.11 grams of isobutyl acetate (dried over 4× Molecular Sieve) and 1.36 grams of a 10% w solution of DABCO T-12 were charged to a 500 ml resin kettle. The kettle was purged with dry nitrogen as it was heated to 80° C. 151.21 grams of a 60% w solution of EB DIOL B in isobutyl acetate was then added dropwise over about a 1.2 hour period. This mass was held at 80° C. for 1 hour to accomplish capping of the EB diol with triisocyanate. At 80° C., this "prepolymer" was clear and moderate viscosity. 23.8 grams of SILQUEST A-189 was then added quickly to the kettle and the mass was held for another 1.3 hours at 80° C. to accomplish capping of the prepolymer with mercaptosilane. The product was clear and low viscosity at 80° C. The product was then poured into ajar for later use.

Table 22 shows results of the Coatings C-1 and C-2 on steel and TPO after 1 week moisture cure at room temperature. Results of the MEK rub test show that both compositions do indeed moisture cure. Both compositions give nice, glossy coatings which do not adhere well to steel but adhere better to TPO. A particularly attractive feature of the silane capped polymer is it had very good mar resistance.

EXAMPLE 19

A hydroxy functional polyurethane resin was made using the following recipe. The NCO/OH ratio for this resin is 0.6.

| Component | Resin Cook A-19, pbw |
|---|---|
| EB Diol D | 1116.0 |
| 2-ethyl-1,3-hexane diol | 127.2 |
| DESMODUR Z-4470 | 612.0 |
| DABCO T-12 | 1.0 |

| Component | Resin Cook A-19, pbw |
|---|---|
| Butyl acetate | 1236.0 |

All the components except the DESMODUR Z-4470 and half the butyl acetate were weighed into a 5-liter flask and heated to 80° C. The DESMODUR Z-4470, dissolved in half of the butyl acetate, was added to the flask slowly with a dropping funnel over about a 1 hour period. The reaction mixture was held another 3 hours at 80° C. with continuous mixing to complete the reaction. The resin was then stored at ambient temperature for later use as the "A" side of a two-component polyurethane.

This resin (Resin Cook A-19) was formulated into a white coating using the following procedure. The following dispersion was made using a high speed disperser fitted with a Cowles blade and mixing for about 30 minutes.

| Dispersion | pbw |
|---|---|
| Resin Cook A-19 | 583.2 |
| Ti-Pure R-706 | 350.9 |
| Xylene | 98.3 |

The following letdown was prepared. Letdown refers to lowering the viscosity (for spraying) by adding a diluent.

| Letdown | pbw |
|---|---|
| DABCO T-12 | 0.18 |
| TINUVIN 400 (25% in xylene) | 28.10 |
| TINUVIN 123 (25% in xylene) | 28.10 |
| IRGANOX 1076 (25% in xylene) | 7.10 |
| Xylene | 836.0 |

The letdown was mixed with the dispersion to give the "A" side of the two-component polyurethane coating. When ready to apply the coating, the "A" side was mixed with the proper amount of DESMODUR Z-4470 to give an NCO/OH ratio of 1.05 (2.6 grams DESMODUR Z-4470 per 100 grams of coating). Enough Aromatic 150 was added to reduce the viscosity of the coating to about 50 centipoise. This composition is referred to as Coating 19-I.

This two-component polyurethane Coating 19-I was spray applied at about 2 mil dry film thickness onto steel panels which had been primed with an electrocoated epoxy primer (E-coat,GM specification ED5000). The coating was cured by baking for 1.5 hours at 121° C. The coating had excellent adhesion to this epoxy primed steel, giving a value of 5 (no adhesion loss) in the crosshatch adhesion test.

EXAMPLE 20

The following two-component polyester-urethane was prepared for use as a clearcoat over the white Coating 19-I basecoat.

| Component | pbw |
|---|---|
| DESMOPHEN 670A-80 | 500.0 |
| DABCO T-12 | 0.6 |
| TINUVIN 400 (25% in butyl acetate) | 48.4 |
| TINUVIN 123 (25% in butyl acetate | 48.4 |
| IRGANOX 1076 (25% in butyl acetate) | 12.0 |
| Xylene | 251.7 |

When ready to spray the coating, enough DESMODUR N-3390 was added to give an NCO/OH ratio of 1.05 (26.4 grams per 100 grams of coating) and enough methy amyl ketone was added to reduce the viscosity to about 50 centipoise. This is referred to as Coating 20-I.

Coating 19-I was sprayed onto thermoplastic polyolefin (TPO, DEXFLEX 880) and onto the E-coat primed steel at a dry film thickness of about 2 mil. Coating 20-I was then sprayed over Coating 19-I, wet on wet, at a dry film thickness of about 1.5 mil. The coatings were cured by baking 1.5 hours at 121° C. Excellent adhesion was found of the clearcoat to the basecoat and of the basecoat to the TPO and epoxy primed steel substrates, all coatings giving a value of 5 in the crosshatch adhesion test.

EXAMPLE 21

The following isocyanate functional polyurethane resin was prepared. The NCO/OH ratio for this resin was 3.0.

| Component | Resin Cook B-21, pbw |
|---|---|
| EB Diol D | 1130.0 |
| DESMODUR Z-4470 | 730.0 |
| DABCO T-12 | 0.8 |
| Butyl acetate | 1860.0 |

The isocyanate, catalyst and half the butyl acetate were placed in a 5-liter flask and heated to 80° C. The EB diol, dissolved in half of the butyl acetate, was added to the flask slowly with a dropping funnel over about a 1 hour period. The resin (Resin Cook B-21) was held for another 3 hours at 80° C. with continuous mixing to complete the reaction. This resin was then stored for later use as a moisture cure urethane or as the "B" side of a two-component polyurethane.

A white, moisture cure polyurethane coating, referred to as Coating 21-I, was prepared as follows. The following dispersion was prepared with a high speed stirrer fitted with a Cowles blade.

| Dispersion | pbw |
|---|---|
| Resin Cook B-21 | 620.0 |
| Ti-Pure R-706 | 91.7 |

The following letdown was prepared.

| Letdown | pbw |
|---|---|
| DABCO T-12 | 0.13 |
| TINUVIN 400 (25% in xylene) | 5.40 |
| TINUVIN 123 (25% in xylene) | 5.40 |
| IRGANOX 1076 (25% in xylene) | 1.37 |

The letdown was mixed with the dispersion and enough xylene was added to reduce the viscosity to about 50 centipoise to give Coating 21-I.

Coating 21-I was sprayed onto EPDM single ply roofing membrane at a dry film thickness of 2 mil. The coating was allowed to cure by reaction with atmospheric moisture. After one month at ambient conditions, the composition cured to give a white, glossy coating. Its adhesion to EPDM was sufficient to remain bonded when the EPDM was stretched and flexed.

EXAMPLE 22

Coating 21-I was used as the "B" side of a two-component polyurethane, the "A" side being 2-ethyl-1,3-hexane diol (PEP diol). When ready to spray the coating, enough PEP diol was mixed with Coating 21-I to give an NCO/OH ratio of 1.05 (2.6 grams per 100 grams coating) and enough xylene was added to reduce the viscosity to about 50 centipoise. This coating is referred to as Coating 22-I.

Coating 22-I was sprayed onto the EPDM roofing membrane at a dry film thickness of about 2 mil. After one month cure at ambient conditions, the composition cured to give a white, glossy coating. Its adhesion to EPDM was sufficient to remain bonded when the EPDM was stretched and flexed.

EXAMPLE 23

Coating 22-I was sprayed onto E-coat epoxy primed steel at a dry film thickness of about 2 mil to give a white basecoat. The polyester-urethane clearcoat, Coating 20-I, was then sprayed over Coating 22-I, wet on wet, at a dry film thickness of about 1.5 mil. The coatings were cured by baking 1.5 hours at 121° C. Excellent adhesion was found for the basecoat to the epoxy primed steel and for the clearcoat to the basecoat, both coatings giving a value of 5 in the crosshatch adhesion test.

EXAMPLE 24

Coating 22-I was sprayed onto a foam rubber gasket typically used in appliances at about 1 mil dry film thickness. Coating 20-I was sprayed over Coating 22-I, wet on wet, at a dry film thickness of about 1.5 mil. The coatings were cured by baking 1.5 hours at 121° C. Excellent adhesion was found for the basecoat to the foam rubber and for the clearcoat to the basecoat. The coatings had excellent flexibility, showing no cracking or loss of adhesion when the foam rubber was streched and flexed. The coatings dramatically reduced the coefficient of friction of the foam and the white basecoat hid the black color of the foam rubber gasket.

I claim:

1. A process for producing a polyurethane resin from a hydrogenated polydiene diol having a hydroxyl equivalent weight of 750 to 10000, a reinforcing agent having a functional group equivalent weight of 30 to 200, and a polyisocyanate curing agent which comprises:
   (a) reacting at least one of the polydiene diol (or polyol) or the reinforcing agent with the polyisocyanate at an NCO/OH molar ratio between 0.4 and 0.7 to form a stable reaction product, wherein the polyisocyanate has more than two isocyanate groups when reacted with the polydiene diol, or two or more isocyanate groups when reacted with the polydiene polyol,
   (b) adding to the product of (a) an additional sufficient amount of the polyisocyanate and, as needed, one or both of the polydiene diol (or polyol) or the reinforcing agent to bring the NCO/OH ratio up to 0.9 to 1.1 and to achieve a polydiene diol or polyol content of 35 to 80% w (on solids basis) and a reinforcing agent content of 2 to 17% w (on solids basis), and
   (c) reacting the mixture of (b) to form a crosslinked polyurethane product.

2. The process of claim 1 wherein the reinforcing agent is a branched aliphatic diol or triol.

3. The process of claim 1 wherein the polydiene diol or polyol is a polybutadiene diol.

4. The process of claim 3 wherein the polybutadiene diol has a vinyl content of at least 30%.

5. The process of claim 1 wherein both the polydiene diol or polyol and the reinforcing agent are reacted in step (a).

6. The process of claim 1 wherein only the polydiene diol or polyol is reacted in step (a).

7. The process of claim 1 wherein only the reinforcing agent is reacted in step (a).

8. The process of claim 1 wherein no more than 10 percent by weight of the reinforcing agent is used.

9. A process for producing a polyurethane resin from a hydrogenated polydiene diol (or polyol) having a hydroxyl equivalent weight of 750 to 10000, a reinforcing agent having a functional group equivalent weight of 30 to 200, and a polyisocyanate curing agent which comprises:
   (a) reacting at least one of the polydiene diol (or polyol) or the reinforcing agent with the polyisocyanate at an functional group/NCO ratio of from 0.25 to 0.5 to form a stable isocyanate terminated reaction product, wherein the polyisocyanate has more than two isocyanate groups when reacted with the hydrogenated polydiene diol, or two or more isocyanate groups when reacted with the hydrogenated polydiene polyol,
   (b) adding to the product of (a) an additional sufficient amount of one or both of the polydiene diol (or polyol) or the reinforcing agent and, as needed, the polyisocyanate to bring the functional group/NCO ratio up to 0.9 to 1.1 and to achieve a polydiene diol or polyol content of 35 to 80% w (on solids basis) and a reinforcing agent content of 2 to 17% (on solids basis), and
   (c) reacting the mixture of (b) to form a crosslinked polyurethane product.

10. The process of claim 9 wherein the reinforcing agent is a branched aliphatic diol or triol.

11. The process of claim 9 wherein the polydiene diol or polyol is a polybutadiene diol.

12. The process of claim 11 wherein the polybutadiene diol has a vinyl content of at least 30%.

13. The process of claim 9 wherein both the polydiene diol or polyol and the reinforcing agent are reacted in step (a).

14. The process of claim 9 wherein only the polydiene diol or polyol is reacted in step (a).

15. The process of claim 9 wherein only the reinforcing agent is reacted in step (a).

16. The process of claim 9 wherein no more than 10 percent by weight of the reinforcing agent is used.

17. A process for producing a polyurethane resin from a hydrogenated polydiene diol or polyol having a hydroxyl equivalent weight of 750 to 10000, a reinforcing agent having a functional group equivalent weight of 30 to 200, and a blocked polyisocyanate curing agent which comprises:

(a) mixing the components together such that the molar ratio of functional groups to completely deblocked NCO would be from 0.9 to 1.1, the polydiene diol or polyol content is 35 to 80% w (on solids basis), and the reinforcing agent content is 2 to 17% w (on solids basis), wherein the blocked polyisocyanate has more than two isocyanate groups when reacted with the polydiene diol, or two or more isocyanate groups when reacted with the polydiene polyol, (b) reacting the components at a temperature and for a time sufficient to deblock enough of the blocked polyisocyanate such that a stable partially reacted polyurethane resin is formed, and (c) deblocking the remainder of the blocked polyisocyanate and reacting it with the partially reacted polyurethane resin of (b) to form a crosslinked polyurethane product.

18. The process of claim 17 wherein the reinforcing agent is a branched aliphatic diol or triol.

19. The process of claim 17 wherein the polydiene diol or polyol is a polybutadiene diol.

20. The process of claim 19 wherein the polybutadiene diol has a vinyl content of at least 30%.

21. The process of claim 17 wherein both the polydiene diol or polyol and the reinforcing agent are reacted in step (a).

22. The process of claim 17 wherein only the polydiene diol or polyol is reacted in step (a).

23. The process of claim 17 wherein only the reinforcing agent is reacted in step (a).

24. The process of claim 17 wherein no more than 10 percent by weight of the reinforcing agent is used.

25. The process of claim 17 wherein the components are reacted at a temperature of 80° C. to 150° C., and for a time of 0.5 hour to 5 hours.

26. The product of the process of claim 1.

27. The product of the process of claim 9.

* * * * *